(12) United States Patent
Deshpande et al.

(10) Patent No.: US 9,709,990 B2
(45) Date of Patent: Jul. 18, 2017

(54) AUTONOMOUS NAVIGATION THROUGH OBSTACLES

(71) Applicant: Toyota Jidosha Kabushiki Kaisha, Toyota-shi, Aichi-ken (JP)

(72) Inventors: Anup Shrikantrao Deshpande, Sterling Heights, MI (US); Kentaro Oguchi, Menlo Park, CA (US)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 13/724,555

(22) Filed: Dec. 21, 2012

(65) Prior Publication Data

US 2014/0180526 A1    Jun. 26, 2014

(51) Int. Cl.
*G05D 1/02* (2006.01)

(52) U.S. Cl.
CPC .......... *G05D 1/0248* (2013.01); *Y10S 901/01* (2013.01)

(58) Field of Classification Search
None
See application file for complete search history.

(56) References Cited

U.S. PATENT DOCUMENTS

| | | | |
|---|---|---|---|
| 4,256,401 A * | 3/1981 | Fujimura | G03G 15/065 355/67 |
| 5,734,441 A * | 3/1998 | Kondo | H04N 5/145 348/207.99 |
| 5,835,684 A * | 11/1998 | Bourne | B25J 9/1666 700/255 |
| 7,188,056 B2 | 3/2007 | Kagarlis | |
| 7,389,210 B2 | 6/2008 | Kagarlis | |
| 7,587,081 B2 * | 9/2009 | Rovira-Mas | G06T 7/70 345/419 |

(Continued)

FOREIGN PATENT DOCUMENTS

KR    2008029679 A  *  4/2008

OTHER PUBLICATIONS

Bennewitz, Maren et al., "Learning Motion Patterns of People for Compliant Robot Motion," International Journal of Robotics Research, Jan. 2005, vol. 24 No. 1, pp. 31-48.

(Continued)

*Primary Examiner* — Jean-Paul Cass
(74) *Attorney, Agent, or Firm* — Patent Law Works LLP

(57) ABSTRACT

A system and method for navigating a mobile automated system through obstacles is disclosed. The system includes a communication module, an estimation module, a density module, a vector module, a navigating module and a command module. The communication module receives image sensor data from one or more sensors. The estimation module estimates one or more obstacle parameters. The density module determines a left obstacle image density and a right obstacle image density for a path from a start point to a navigating destination based on the one or more obstacle parameters. The vector module generates a vector model to determine a navigating direction based on the left obstacle image density and the right obstacle image density. The navigating module determines a navigating velocity for navigating the mobile automated system to the navigating destination. The command module generates one or more navigating commands based on the navigating velocity.

30 Claims, 11 Drawing Sheets

(56) References Cited

U.S. PATENT DOCUMENTS

| | | | | |
|---|---|---|---|---|
| 8,175,374 | B2* | 5/2012 | Pinault | G06K 9/00201 |
| | | | | 382/154 |
| 8,553,939 | B2* | 10/2013 | Craig | G06K 9/00369 |
| | | | | 375/240.12 |
| 8,564,657 | B2* | 10/2013 | Michalke | G06T 7/251 |
| | | | | 348/116 |
| 8,600,589 | B2* | 12/2013 | Mendez-Rodriguez | G01S 17/89 |
| | | | | 701/16 |
| 8,613,666 | B2* | 12/2013 | Esaki | G06F 3/017 |
| | | | | 463/37 |
| 8,700,232 | B2* | 4/2014 | Caillaud | G06Q 10/06 |
| | | | | 701/3 |
| 2006/0098893 | A1* | 5/2006 | Kondo | G06K 9/4609 |
| | | | | 382/266 |
| 2006/0140497 | A1* | 6/2006 | Kondo | G06K 9/4609 |
| | | | | 382/254 |
| 2006/0147128 | A1* | 7/2006 | Kondo | G06T 1/00 |
| | | | | 382/300 |
| 2006/0159368 | A1* | 7/2006 | Kondo | G06T 1/00 |
| | | | | 382/299 |
| 2006/0233460 | A1* | 10/2006 | Kondo | G06T 3/403 |
| | | | | 382/276 |
| 2007/0188490 | A1* | 8/2007 | Kanai | G06T 17/10 |
| | | | | 345/423 |
| 2008/0198231 | A1* | 8/2008 | Ozdemir | G08B 13/19608 |
| | | | | 348/159 |
| 2008/0253613 | A1* | 10/2008 | Jones | G06F 3/017 |
| | | | | 382/103 |
| 2009/0306946 | A1 | 12/2009 | Badler et al. | |
| 2011/0160937 | A1* | 6/2011 | Caillaud | G06Q 10/06 |
| | | | | 701/3 |
| 2011/0246055 | A1 | 10/2011 | Huck et al. | |
| 2011/0304619 | A1* | 12/2011 | Fu | G06K 9/00201 |
| | | | | 345/420 |
| 2012/0179322 | A1* | 7/2012 | Hennessy | G05D 1/0278 |
| | | | | 701/25 |
| 2013/0330008 | A1* | 12/2013 | Zadeh | G06N 7/02 |
| | | | | 382/195 |
| 2015/0094850 | A1* | 4/2015 | Passot | B25J 9/163 |
| | | | | 700/245 |
| 2015/0094852 | A1* | 4/2015 | Laurent | G05D 1/00 |
| | | | | 700/250 |
| 2015/0355098 | A1* | 12/2015 | Hsieh | G01N 21/84 |
| | | | | 250/224 |

OTHER PUBLICATIONS

Henry, Peter, et al., "Learning to Navigate Through Crowded Environments," 2010 IEEE International Conference on Robotics and Automation (ICRA), May 3-7, 2010, pp. 981-986.

Trautman, Peter et al., "Unfreezing the Robot: Navigation in Dense, Interacting Crowds," IEEE International Conference on Intelligent Robots and Systems (IROS), Oct. 18-22, 2010, pp. 797-803.

* cited by examiner

Turn right

Turn right and slow down

Slow down

Turn right and slow down

Turn right

Slow down and cross the flow

Turn left and slow down

Slow down and cross the flow

AUTONOMOUS NAVIGATION THROUGH OBSTACLES

BACKGROUND

The specification relates to a navigation system. In particular, the specification relates to a system and method for navigating a mobile automated system through obstacles.

It is a challenge to navigate a mobile automated system (e.g., a robot) in a dynamic environment that includes dynamic obstacles such as human crowds, a combination of static obstacles and moving obstacles, etc. Generally, only a very limited amount of information regarding the dynamic environment is available since the environment keeps changing continuously. For example, the number of moving objects (e.g., crowds of walking people) in the environment changes all the time and the paths and the destinations of the moving objects are unknown. This dynamic change in the environment presents a challenge to determine a safe and collision free path for navigating the mobile automated system to a destination while respecting social behavior norms.

Existing solutions fail to provide an effective approach for navigating a mobile automated system in such a dynamic environment having heavy crowds. Furthermore, existing solutions requires training data to learn motion patterns in the dynamic environment which makes the performance dependent on the quality of the training data. Existing solutions provides non-optimal performance when there is no training data available and/or when the quality of the training data is low.

SUMMARY

The specification overcomes the deficiencies and limitations of the prior art at least in part by providing a system and method for navigating a mobile automated system through obstacles. The system includes a communication module, an estimation module, a density module, a vector module, a navigating module and a command module. The communication module receives image sensor data from one or more sensors. The estimation module estimates one or more obstacle parameters based at least in part on the image sensor data. The density module determines a left obstacle image density and a right obstacle image density for a path from a start point to a navigating destination based at least in part on the one or more obstacle parameters. The vector module generates a vector model to determine a navigating direction based at least in part on the left obstacle image density and the right obstacle image density. The navigating module determines a first navigating velocity for navigating the mobile automated system to the navigating destination based at least in part on the navigating direction. The command module generates one or more first navigating commands to navigate the mobile automated system to the navigating destination based at least in part on the first navigating velocity.

The system is particularly advantageous in numerous respects. First, the system does not require any learning methods and navigates a mobile automated system automatically through obstacles (e.g., heavy crowds of people) in a safe and collision-free approach without a need for training data. Second, the system utilizes local information of an original path (e.g., local image sensor data in a visible range of a sensor) to determine local obstacle image densities, and then determines a new optimal path for navigating the mobile automated system to an intermediate destination with least obstacles. The system provides a step-by-step navigation route to avoid interference from obstacles by navigating the mobile automated system from an intermediate destination to another intermediate destination and ultimately to the final destination. Third, the system provides a fast, responsive and consistent approach to navigate the mobile automated system through all types of obstacle flows (e.g., same direction flow, opposite direction flow, cross flow, sparse obstacles, dense obstacles, etc.). Fourth, the system takes into account social behavior norms such as avoiding approaching flows and joining similar direction flows and therefore provides a human-like navigation approach to the mobile automated system.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
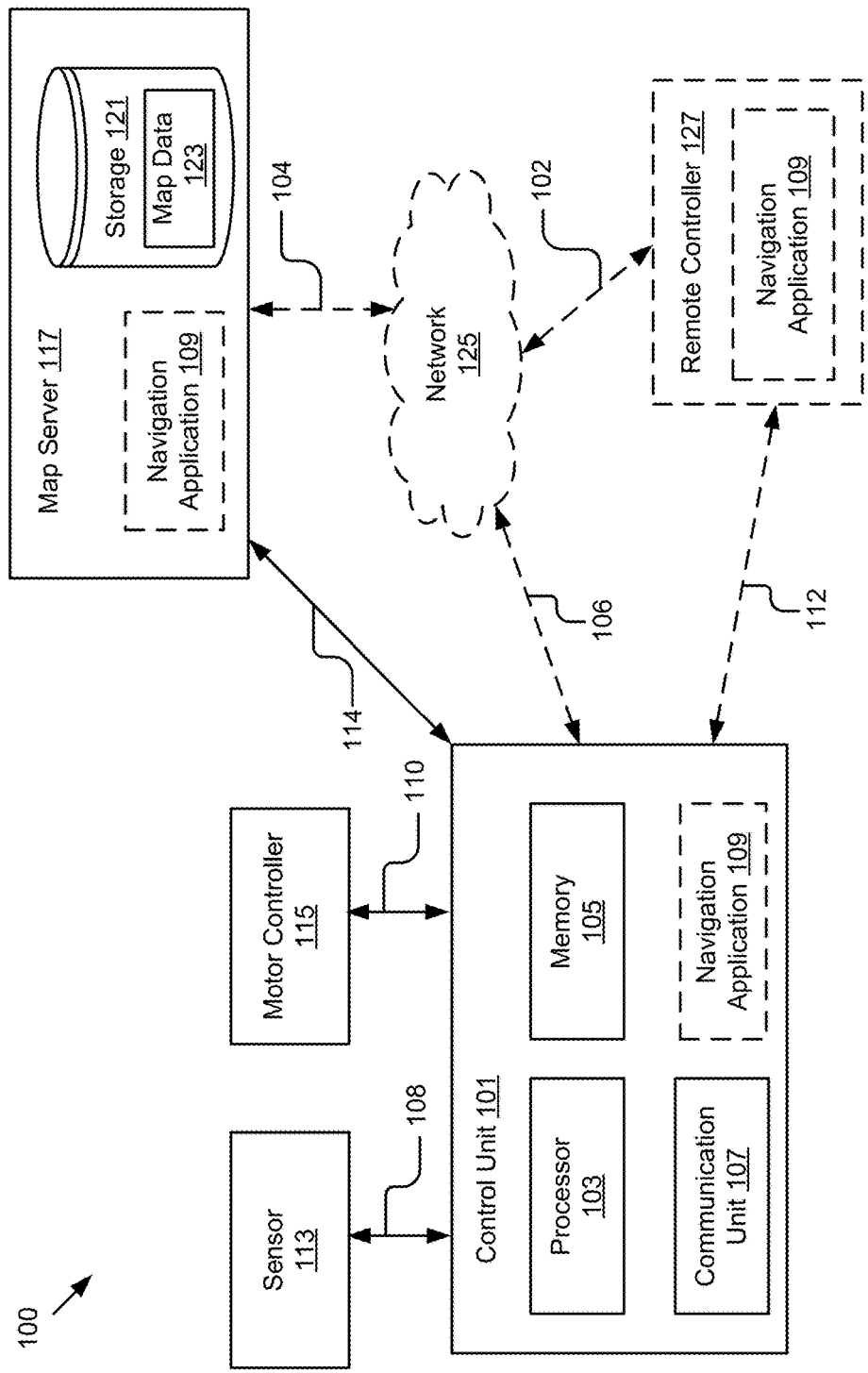
FIG. 1 is a high-level block diagram illustrating a system for navigating a mobile automated system through obstacles according to one embodiment.

A system and method for navigating a mobile automated system through obstacles is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for automatically navigating a mobile automated system through obstacles according to one embodiment. The illustrated system 100 includes a control unit 101, a sensor 113, a motor controller 115 and a map server 117. While only one control unit 101, one sensor 113, one motor controller 115 and one map server 117 are depicted in FIG. 1, the system 100 could include one or more control units 101, one or more sensors 113, one or more motor controllers 115 and one or more map servers 117. One skilled in the art will also appreciate that the system 100 may include other entities not shown in FIG. 1 such as a display device and an input device, etc.

In the illustrated embodiment, the sensor 113 is communicatively coupled to the control unit 101 via signal line 108. The motor controller 115 is communicatively coupled to the control unit 101 via signal line 110. The map server 117 is communicatively coupled to the control unit 101 via signal line 114.

Optionally, the system 100 includes a remote controller 127. The remote controller 127 is coupled to the control unit 101 via signal line 112. In one embodiment, the entities of the system 100 are coupled to an optional network 125. For example, the control unit 101 is coupled to the network 125 via signal line 106. The map server 117 is coupled to the network 125 via signal line 104. The remote controller 127 is coupled to the network 125 via signal line 102.

In one embodiment, one or more of the control unit 101, the sensor 113, the motor controller 115 and the map server 117 are comprised within a mobile automated system. A mobile automated system is a mobile node that moves automatically. For example, a mobile automated system is a robot. In another embodiment, only the control unit 101, the sensor 113 and the motor controller 115 are comprised within the mobile automated system, and the map server 117 is communicatively coupled to the control unit 101 via the network 125. In yet another embodiment, only the sensor 113 and the motor controller 115 are comprised within the mobile automated system.

The control unit 101 is any processor-based computing device. For example, the control unit 101 is an electronic control unit ("ECU") implemented in a mobile automated system. In one embodiment, the control unit 101 is implemented using a single integrated circuit such as a system-on-chip (SOC). In other embodiments, the control unit 101 is any computing device such as a laptop computer, a desktop computer, a tablet computer, a mobile telephone, a personal digital assistant (PDA) or any other computing device with one or more processors embedded therein, etc. The control unit 101 includes, among other things, a processor 103, a memory 105, a communication unit 107 and a navigation application 109. These components of the control unit 101 are communicatively coupled to each other. In one embodiment, the control unit 101 includes any other components conventional to a control unit such as a storage device (not pictured), etc.

The processor 103 comprises an arithmetic logic unit, a microprocessor, a general purpose controller or some other processor array to perform computations, retrieve data stored on the memory 105 and other storage devices, etc. Processor 103 processes data signals and may comprise various computing architectures including a complex instruction set computer (CISC) architecture, a reduced instruction set computer (RISC) architecture, or an architecture implementing a combination of instruction sets. Although only a single processor 103 is shown in FIG. 1, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 105 stores instructions and/or data that may be executed by the processor 103. The instructions and/or data may include code for performing the techniques described herein. The memory 105 may be a dynamic random access memory (DRAM) device, a static random access memory (SRAM) device, flash memory or some other memory device. In some embodiments, the memory 105 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 107 handles communications between the control unit 101 and other components of the system 100. For example, the communication unit 107 receives sensor data from the sensor 113 and sends the sensor data to the navigation application 109. In another example, the communication unit 107 receives motion commands from the navigation application 109 and sends the motion commands to the motor controller 115. The motion commands are described below in more detail.

In one embodiment, the communication unit 107 includes a network interface for connecting the control unit 101 to the network 125. In one embodiment, the communication unit 107 includes a port for direct physical connection to the network 125 or to another communication channel. For example, the communication unit 107 includes a universal serial bus (USB), category 5 cable (CAT-5) or similar port for wired communication with the network 105. In another embodiment, the communication unit 107 includes a wireless transceiver for exchanging data with the network 125, or with another communication channel, using one or more wireless communication methods, such as IEEE 802.11, IEEE 802.16, BLUETOOTH®, near field communication (NFC) or another suitable wireless communication method. In one embodiment, the communication unit 107 includes a NFC chip that generates a radio frequency (RF) for short-range communication.

In some embodiments, the communication unit 107 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 107 also provides other conventional connections to the network 125 for distribution of files and/or media objects using standard network protocols including TCP/IP, HTTP, HTTPS and SMTP, etc. One having ordinary skill in the art will recognize that the communication unit 107 may include other types of devices for providing the functionality described herein.

The navigation application 109 is code and routines for automatically navigating a mobile automated system through obstacles. In one embodiment, the navigation application 109 includes code and routines stored in an on-chip storage of the processor 103. In another embodiment, the navigation application 109 is implemented using hardware such as a field-programmable gate array (FPGA) or an application-specific integrated circuit (ASIC). In yet another embodiment, the navigation application 109 is implemented using a combination of hardware and software. The navigation application 109 is depicted using dashed lines to indicate that in one embodiment the navigation application 109 is comprised within the control unit 101, while in other embodiments the navigation application 109 is comprised within another device (e.g., the map server 117 or the remote controller 127) and/or a combination of the devices.

In one embodiment, the navigation application 109 navigates a mobile automated system in view of one or more facts: (1) that humans rely on local visible information when navigating through obstacles and do not rely on estimation of obstacle information not yet visible; and (2) that not all types of crowd flows are obstacles (e.g., approaching crowd flows such as flows in an opposite direction are obstacles, but crowd flows in the same direction as the navigation direction are less likely to be obstacles). The navigation application 109 is described below in more detail with reference to FIGS. 2-4C.

The sensor 113 is any type of conventional sensor configured to collect any type of data. For example, the sensor 113 is a sensor configured to collect image sensor data. In one embodiment, the sensor 113 is one of a time of flight (TOF) camera sensor, a stereo camera sensor and a 3D Kinect® camera sensor. The sensor 113 can be other types of sensors for providing image sensor data to the system 100.

The motor controller 115 is a device for controlling a motor installed in a mobile automated system. For example, the motor controller 115 controls movements of a robot including a direction and a speed to move the robot. In one embodiment, the motor controller 115 receives one or more motion commands from the navigation application 109 and controls the movement of a mobile automated system based at least in part on the one or more motion commands. In another embodiment, the motor controller 115 steers the movements of the mobile automated system according to the one or more motion commands. In yet another embodiment, the motor controller 115 receives a stop command from the navigation application 109 and stops the motion of the mobile automated system.

A motion command is a command for controlling movements of a mobile automated system. For example, a motion command instructs the motor controller 115 to navigate a mobile automated system to a destination in a specified navigating direction (e.g., a straight ahead direction, a direction with 45° away from the straight-line path on the left) with a specified linear velocity (e.g., 0.5 m/s). In another example, a motion command instructs the motor controller 115 to slow down or speed up the movement of the mobile automated system. In yet another example, a motion command instructs the motor controller 115 to start or stop the movement of the mobile automated system. Other examples of motion commands are possible.

The map server 117 is a computing device that includes a processor, a memory and optionally network communication capabilities. In one embodiment, the map server 117 provides data describing a navigation map to the navigation application 109. For example, the map server 117 provides map data describing a shortest path (or, one or more possible paths) from a start point to a final destination. In the illustrated embodiment, the map server 117 includes a storage device 121.

The storage device 121 is a non-transitory memory that stores data. For example, the storage device 121 is a dynamic random access memory (DRAM) device, a static random access memory (SRAM) device, flash memory or some other memory device known in the art. In one embodiment, the storage device 121 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

In the illustrated embodiment, the storage device 121 stores map data 123. Map data 123 is data describing one or more maps for a geographical region. For example, the map data 123 includes data describing a floor plan for a building where a mobile automated system is navigated in. In another example, the map data 123 includes data describing sidewalks of a road where a mobile automated system is navigated on. Other types of map data are possible.

The optional remote controller 127 is a computing device that includes a processor, a memory and network communication capabilities. For example, the remote controller 127 is a device that controls a mobile automated system remotely. In one embodiment, the remote controller 127 optionally includes a navigation application 109.

The optional network 125 is a conventional type of network, wired or wireless, and may have any number of configurations such as a star configuration, token ring configuration or other configurations known to those skilled in the art. In one embodiment, the network 125 comprises one or more of a local area network (LAN), a wide area network (WAN) (e.g., the Internet) and/or any other interconnected data path across which multiple devices communicate. In another embodiment, the network 125 is a peer-to-peer network. The network 125 is coupled to or includes portions of a telecommunications network for sending data in a variety of different communication protocols. For example, the network 125 is a 3G network or a 4G network. In yet another embodiment, the network 125 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 125 are encrypted using conventional encryption technologies such as secure sockets layer (SSL), secure HTTP and/or virtual private networks (VPNs).

Navigation Application

Figure 2:
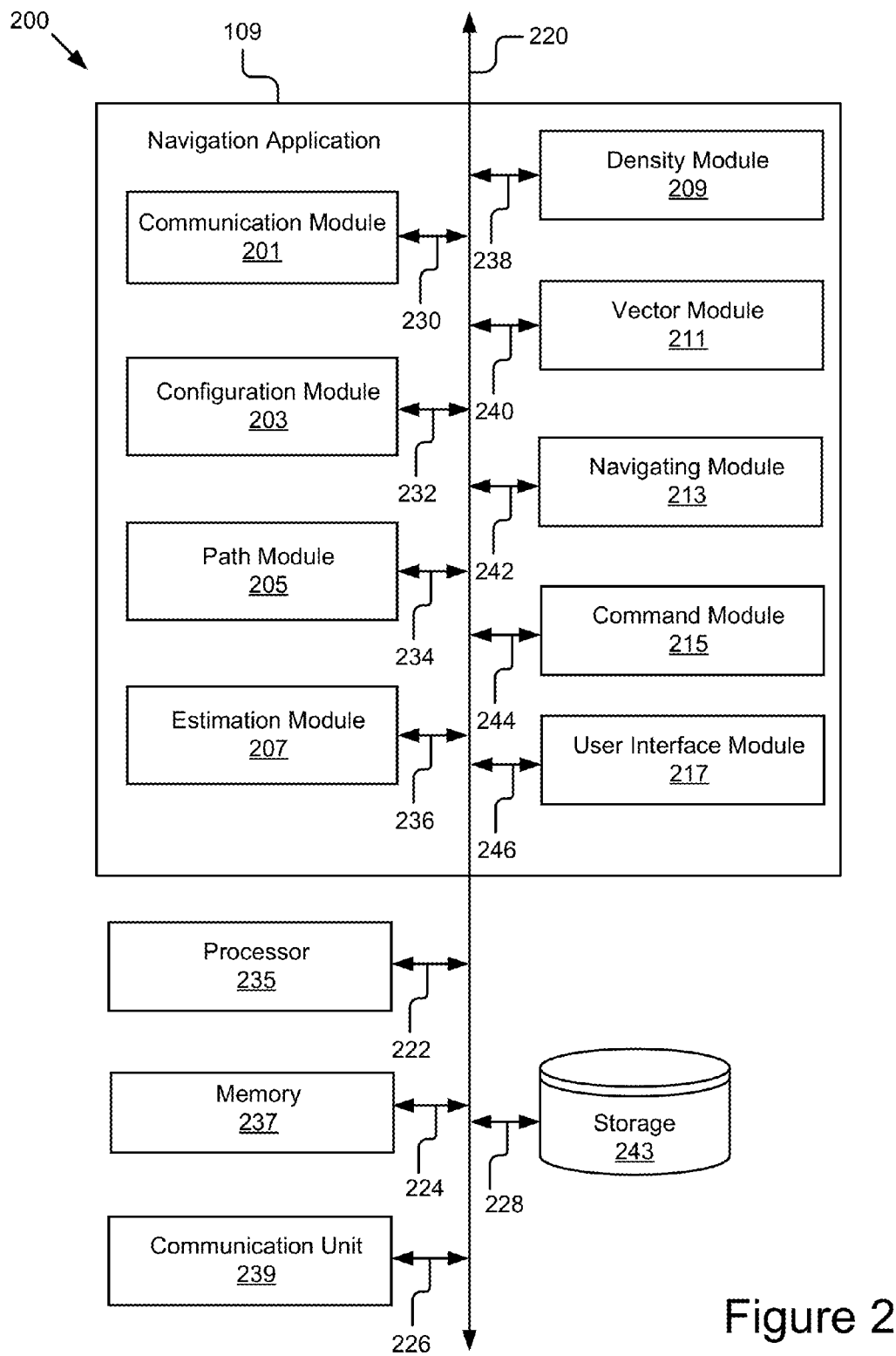
FIG. 2 is a block diagram illustrating a navigation application according to one embodiment.

Referring now to FIG. 2, the navigation application 109 is shown in more detail. FIG. 2 is a block diagram illustrating a computing device 200 according to one embodiment. The computing device 200 includes the navigation application 109, a processor 235, a memory 237, a communication unit 239 and a storage device 243. These components of the computing device 200 are communicatively coupled by a bus 220. In one embodiment, the computing device 200 is one of the control unit 101, the map server 117 and the remote controller 127.

The processor 235 provides functionality similar to those described above for the processor 103. The memory 237 provides functionality similar to those described above for the memory 105. The communication unit 239 provides functionality similar to those described above for the communication unit 107. The descriptions for these components will not be repeated here. The processor 235 is communicatively coupled to the bus 220 via signal line 222. The memory 237 is communicatively coupled to the bus 220 via signal line 224. The communication unit 239 is communicatively coupled to the bus 220 via signal line 226.

The storage device 243 is a non-transitory memory that stores data. For example, the storage device 243 is a dynamic random access memory (DRAM) device, a static random access memory (SRAM) device, flash memory or some other memory device known in the art. In one embodiment, the storage device 243 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

In one embodiment, the storage 243 stores data for providing the functionality described herein. For example, the storage 243 stores one or more of a start point, an intermediate destination, a final destination, a route, one or more obstacle parameters, a left obstacle image density and/or a right obstacle image density for a path. In another example, the storage 243 stores a navigating velocity and/or one or more motion commands for navigating a mobile automated system from a start point to an intermediate destination and/or a final destination. The left obstacle image density, the right obstacle image density and the navigating velocity are described below in more detail. In one embodiment, the storage 243 stores image sensor data received from the sensor 113.

In the illustrated embodiment, the navigation application 109 includes a communication module 201, a configuration module 203, a path module 205, an estimation module 207, a density module 209, a vector module 211, a navigating module 213, a command module 215 and a user interface module 217. These components of the navigation application 109 are communicatively coupled to the bus 220 for communication with each other and/or other components of the computing device 200.

The communication module 201 is code and routines that, when executed by the processor 235, handles communications between components of the navigation application 109 and other components of the system 100. For example, the communication module 201 receives image sensor data from the sensor 113 via the communication unit 239 and sends the image sensor data to the estimation module 207. In one embodiment, the communication module 201 receives data describing motion commands from the command module 215 and sends the data to the motor controller 115 via the communication unit 239. In another embodiment, the communication module 201 receives map data from the map server 117 and sends the map data to the path module 205. The communication module 201 is communicatively coupled to the bus 220 via signal line 230.

In one embodiment, the communication module 201 receives graphical data from the user interface module 217 and sends the graphical data to the control unit 101 for displaying a user interface to a user. In another embodiment, the communication module 201 receives data (e.g., velocity data) from other components of the navigation application 109 (e.g., the navigating module 213) and stores the data in the storage 243. In yet another embodiment, the communication module 201 retrieves data from the storage 243 and sends the data to other components of the navigation application 109. In other embodiments, the communication module 201 may provide any other functionality for handling communications described herein.

The configuration module 203 is code and routines that, when executed by the processor 235, configures navigation parameters. The configuration module 203 is communicatively coupled to the bus 220 via signal line 232. Examples of a navigation parameter include, but are not limited to, a start point and a navigating destination (e.g., a final destination, an intermediate destination) for a navigation process. A final destination is an ultimate destination that a mobile automated system navigates to. An intermediate destination is any destination that a mobile automated system arrives at before reaching a final destination. A navigating destination is any destination that a mobile automated system is navigated to. For example, a navigating destination is one of an intermediate destination and a final destination.

In one embodiment, the configuration module 203 determines a start point for a navigation process. For example, the configuration module 203 determines a current location of a mobile automated system using a global positioning system (GPS) and configures a start point for the navigation process as the current location. In another example, the configuration module 203 receives data describing a start point from a user and configures the start point using the received data. In yet another example, the configuration module 203 receives a signal from the navigating module 213 indicating that the mobile automated system has arrived at the navigating destination. The arrived navigating destination is not the final destination. The configuration module 203 configures a new start point for a next navigation process to the final destination as the arrived navigating destination.

In one embodiment, the configuration module 203 determines a navigating destination for a navigation process. For example, the configuration module 203 receives data describing a final destination from a user via the communication module 201 and sets the navigating destination to be the final destination. In another example, the configuration module 203 receives data describing an intermediate destination from the navigating module 213 and sets the navigating destination to be the intermediate destination. In yet another example, the configuration module 203 receives a signal from the navigating module 213 indicating that the mobile automated system has arrived at the current navigating destination. The arrived navigating destination is not the final destination. The configuration module 203 sets a new navigating destination for a next navigation process to be the final destination.

The path module 205 is code and routines that, when executed by the processor 235, determines a path from a start point to a navigating destination. In the illustrated embodiment, the path module 205 is communicatively coupled to the bus 220 via signal line 234. In one embodiment, the path module 205 receives data describing a start point and a navigating destination from the configuration module 203. The path module 205 receives map data from the map server 117. The path module 205 determines a path from the start point to the navigating destination based at least in part on the map data. For example, the path module 205 determines one or more possible paths from the start point to the navigating destination based at least in part on a map described by the map data, and selects a preferred path from the one or more possible paths.

In one embodiment, a preferred path is a shortest path having a minimum distance from a start point to a navigating destination. For example, a preferred path is a straight-line path from a start point to a navigating destination such as an intermediate destination or a final destination. In another embodiment, a preferred path is a path with least obstacles comparing to other possible paths.

The estimation module 207 is code and routines that, when executed by the processor 235, estimates one or more obstacle parameters. In the illustrated embodiment, the estimation module 207 is communicatively coupled to the bus 220 via signal line 236. An obstacle is any object that obstructs a movement of a mobile automated system on a path. For example, a tree fallen on a path is an obstacle for a mobile automated system navigated on the path. In one embodiment, the obstacles on a path are static objects with no movement (referred to as static obstacles). For example, stones on a path are static obstacles. In another embodiment, the obstacles on a path are moving objects (referred to as dynamic obstacles). For example, a crowd of people walking on a road are dynamic obstacles for a mobile automated system navigated on the same road or navigated to cross the road. In yet another embodiment, the obstacles on a path include a combination of static obstacles and dynamic obstacles.

Figure 5A:
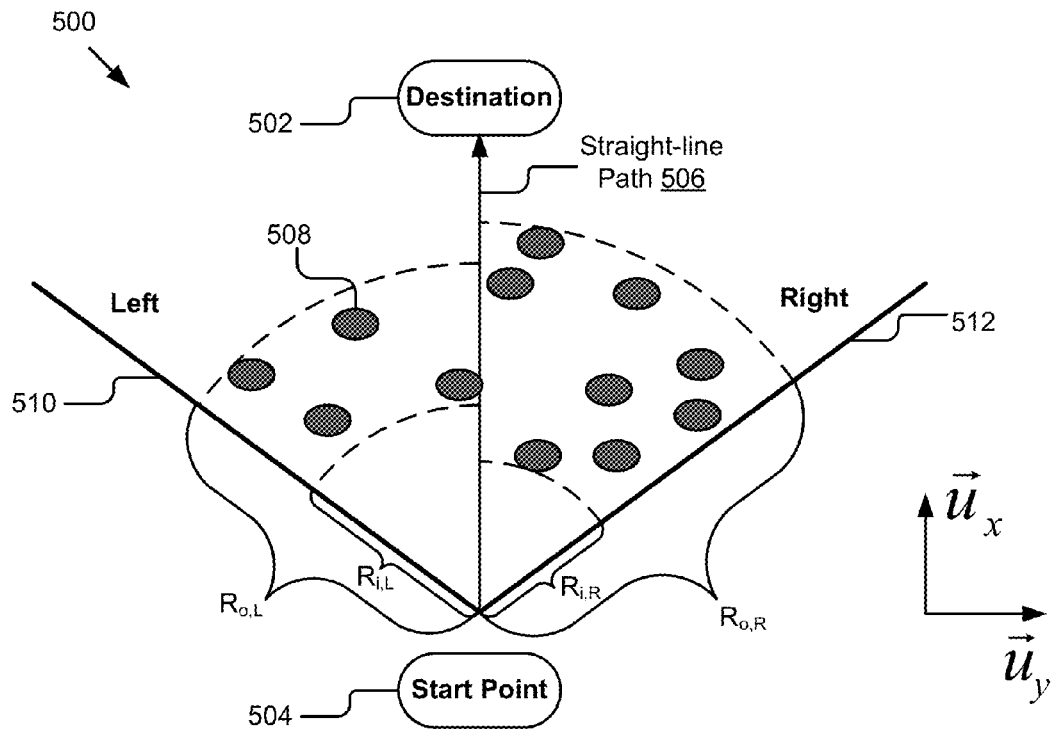
FIG. 5A is a graphical representation illustrating a field of view of a mobile automated system using a sensor according to one embodiment.

An obstacle parameter is a parameter describing one or more obstacles. For example, an obstacle parameter describes one of: a number of obstacles detected on a path (e.g., a number of people detected within a field of view of a sensor 113); a distance from a mobile automated system (e.g., a robot) to each of the obstacles; a velocity of each obstacle relative to the mobile automated system; and a range distribution factor for the obstacles. A field of view for a sensor 113 is a visible range captured by the sensor 113. An example of a field of view for a sensor 113 is depicted in FIG. 5A. A range distribution factor for the obstacles is a parameter describing distribution of the obstacles. For example, a range distribution factor for a crowd of people describes distribution of the people in the crowd and is determined by positions of the people in the crowd.

In one embodiment, the estimation module 207 receives image sensor data from the sensor 113 via the communication module 201. The image sensor data captures an environment or a surrounding for at least a portion of a path from a start point to a navigating destination. For example, the image sensor data captures an environment within a visible range of the sensor 113 associated with a straight-line path from a start point to a navigating destination. The estimation module 207 processes the image sensor data to determine whether an environment within the field of view of the sensor 113 is free from obstacles. For example, the estimation module 207 determines whether an environment for a straight-line path from the start point to the navigating destination is free of obstacles.

If the environment for the path is free of obstacles, the estimation module 207 generates a clear signal to the navigating module 213, causing the navigating module 213 to generate a navigating velocity for navigating the mobile automated system through the clear path to the navigating destination. For example, if a straight-line path from a start point to a final destination is free of obstacles, the estimation module 207 instructs the navigating module 213 to generate a navigating velocity for navigating the mobile automated system along the clear straight-line path to the final destination.

However, if the environment for the path is not free from obstacles, the estimation module 207 estimates one or more obstacle parameters describing the obstacles on the path from the image sensor data. For example, the estimation module 207 processes the image sensor data to estimate one or more obstacle parameters such as: a number of people detected within a field of view of a sensor 113 on the path; a distance from the mobile automated system to each person in the crowd of people; a velocity of each person relative to the mobile automated system; and a range distribution factor for the crowd of people.

In one embodiment, the one or more obstacle parameters describe one or more moving objects (e.g., a crowd of people walking on the path). In another embodiment, the one or more obstacle parameters describe one or more static objects. In yet another embodiment, the one or more obstacle parameters describe a combination of moving objects and static objects. In one embodiment, the one or more obstacle parameters include one or more left obstacle parameters and one or more right obstacle parameters as described below.

In one embodiment, a sensor 113 installed in a mobile automated system is faced towards the navigating destination. The estimation module 207 receives, from the sensor 113, image sensor data related to a left portion of the field of view of the sensor 113 (referred to as left image sensor data). An example of a left portion of a field of view of a sensor 113 is an area between a straight-line path 506 and a line 510 as shown in FIG. 5A. The estimation module 207 determines one or more obstacle parameters on the left portion of the field of view of the sensor 113 (referred to as left obstacle parameters) based at least in part on the corresponding left image sensor data. The left obstacle parameters are parameters describing obstacles on a left portion of a field of view of a sensor 113. For example, the estimation module 207 estimates one or more left obstacle parameters such as: a number of people detected within a left portion of a field of view of a sensor 113 on the path; a distance from the mobile automated system to each person on the left portion of the field of view; a velocity of each person on the left portion relative to the mobile automated system; and a range distribution factor for the crowd of people on the left portion of the field of view.

The estimation module 207 also receives image sensor data related to a right portion of the field of view of the sensor 113 (referred to as right image sensor data). An example of a right portion of a field of view of a sensor 113 is an area between a straight-line path 506 and a line 512 as shown in FIG. 5A. The estimation module 207 determines one or more obstacle parameters on the right portion of the field of view of the sensor 113 (referred to as right obstacle parameters) based at least in part on the corresponding right image sensor data. The right obstacle parameters are parameters describing obstacles on a right portion of the field of view of the sensor 113. For example, the estimation module 207 estimates one or more right obstacle parameters such as: a number of people detected within a right portion of a field of view of a sensor 113 on the path; a distance from the mobile automated system to each person on the right portion of the field of view; a velocity of each person on the right portion relative to the mobile automated system; and a range distribution factor for the crowd of people on the right portion of the field of view.

In one embodiment, the estimation module 207 stores the one or more obstacle parameters including the left obstacle parameters and the right obstacle parameters in the storage 243. In another embodiment, the estimation module 207 sends the one or more obstacle parameters to the density module 209.

The density module 209 is code and routines that, when executed by the processor 235, generates an obstacle image density. In the illustrated embodiment, the density module 209 is communicatively coupled to the bus 220 via signal line 238. An obstacle image density is data describing a density of obstacles in a field of view of a sensor 113. For example, an obstacle image density describes a density of obstacles within a visible range of a sensor 113. In one embodiment, an obstacle image density is a local density determined using local information such as local image sensor data within a visible range of a sensor 113.

In one embodiment, the density module 209 receives one or more obstacle parameters from the estimation module 207 and determines an obstacle image density using a utility function. A utility function is a function of one or more of: a number of detected obstacles in the field of view of the sensor 113; relative velocities between the obstacles and the mobile automated system; distances from the obstacles to the mobile automated system; and a sensor range of the sensor 113. For example, the density module 209 uses the one or more obstacle parameters as inputs to a utility function and applies the utility function to determine a left obstacle image density and a right obstacle image density respectively. The left obstacle image density and the right obstacle image density are described below in more detail. In a further example, the density module 209 determines an obstacle image density as:

$$\text{Density} = f(n, x_{1\ldots n}, y_{1\ldots n}, t, v, R_{max}, R_{min}) = \frac{f_1(n, v) \times K_{rdf}}{f_2(\phi, x_{1\ldots n}, y_{1\ldots n})}.$$

The symbol "t" represents the time when the obstacles are detected. The symbol "$R_{max}$" represents a maximum sensor range. The symbol "$R_{min}$" represents a minimum sensor range. The symbol "$\phi$" represents a field of view of the sensor 113. The symbols "$f$," "$f_1$" and "$f_2$" represent different utility functions. An example of a utility function is described below with reference to FIG. 5A.

The symbols "n," "$x_{1 \ldots n}$," "$y_{1 \ldots n}$," "v" and "$K_{rdf}$" represent various obstacle parameters. For example, the symbol "n" represents a number of obstacles (e.g., a number of people) detected in a field of view of the sensor 113. The symbol "$x_{1 \ldots n}$" represents an x-axis component of distances from the mobile automated system to the people. The symbol "$y_{1 \ldots n}$" represents an y-axis component of distances from the mobile automated system to the people. The symbol "v" represents an average relative velocity between the mobile automated system and the obstacles (e.g., an average relative velocity between a robot and a crowd of people). The symbol "$K_{rdf}$" represents a range distribution factor.

In one embodiment, an obstacle image density is one of a left obstacle image density and a right obstacle image density. When a sensor 113 installed in a mobile automated system is faced towards the navigating destination, a left obstacle image density is a density of obstacles on a left portion of a field of view of the sensor 113. For example, a left obstacle image density is an obstacle image density on a left hand side of a path from a start point to a navigating destination. A right obstacle image density is a density of obstacle on a right portion of the field of view of the sensor 113. For example, a right obstacle image density is an obstacle image density on a right hand side of a path from a start point to a navigating destination.

In one embodiment, the density module 209 applies the utility function to determine a left obstacle image density by using one or more left obstacle parameters as inputs to the utility function. For example, the density module 209 uses values of the obstacle parameters (such as "n," "$x_{1 \ldots n}$," "$y_{1 \ldots n}$," "v" and "$K_{rdf}$") related to the left portion of the field of view of the sensor 113 as inputs to the utility function and obtains a left obstacle image density as an output from the utility function. The density module 209 applies the utility function to determine a right obstacle image density by using one or more right obstacle parameters as inputs to the utility function. For example, the density module 209 uses values of the obstacle parameters (such as "n," "$x_{1 \ldots n}$," "$y_{1 \ldots n}$," "v" and "$K_{rdf}$") related to the right portion of the field of view of the sensor 113 as inputs to the utility function and obtains a right obstacle image density as an output from the utility function. An example to determine a left obstacle image density and a right obstacle image density is illustrated with reference to FIG. 5A.

In one embodiment, the density module 209 stores the left obstacle image density and the right obstacle image density in the storage 243. In another embodiment, the density module 209 sends the left obstacle image density and the right obstacle image density to the vector module 211.

The vector module 211 is code and routines that, when executed by the processor 235, generates a vector model to determine a navigating direction. In the illustrated embodiment, the vector module 211 is communicatively coupled to the bus 220 via signal line 240. In one embodiment, the vector module 211 receives a left obstacle image density (represented as "$\vec{D}_L$") and a right obstacle image density (represented as "$\vec{D}_R$") from the density module 209. In one embodiment, the left obstacle image density and the right obstacle image density have opposite directions. For example, the left obstacle image density is $\vec{d}_L = 10 \, \vec{u}_y$ and the right obstacle image density is $\vec{D}_R = -12 \, \vec{u}_y$, wherein $\vec{u}_y$ is a unit vector in a direction orthogonal to a direction of a straight-line path from the start point to the navigating destination. For example, $\vec{u}_y$ is orthogonal to $\vec{u}_x$, wherein $\vec{u}_x$ represents a unit vector in the direction of a straight-line path from the start point to the navigating destination. Examples of $\vec{u}_y$ and $\vec{u}_x$ are depicted in FIG. 5A.

The vector module 211 determines a vector model to generate a net density (represented as "$\vec{D}_{net}$") and a direction vector (represented as "$\vec{V}_{dir}$"). Examples of a vector model are illustrated in FIGS. 5B and 6A-6F. For example, the vector module 211 applies the vector model to determine the net density as:

$$\vec{D}_{net} = \vec{D}_L + \vec{D}_R.$$

The vector module 211 applies the vector model to determine the direction vector as:

$$\vec{V}_{dir} = \vec{D}_{net} + \vec{u}_x.$$

The vector module 211 determines a navigating direction as the same direction as the direction vector "$\vec{V}_{dir}$." For example, if the direction vector "$\vec{V}_{dir}$" is in a 45°-angle direction away from the straight-line path on the left portion of the field of view, the vector module 211 determines the navigating direction as the same 45°-angle direction away from the straight-line path on the left portion of the field of view. In one embodiment, the navigating direction is a new direction to navigate the mobile automated system to an intermediate destination. The intermediate destination is described below in more detail. In one embodiment, the navigating direction is a direction with the least obstacle image density so that the mobile automated system is navigated through a new path with the least obstacles.

In one embodiment, the vector module 211 stores the navigating direction in the storage 243. In another embodiment, the vector module 211 sends the navigating direction to the navigating module 213.

The navigating module 213 is code and routines that, when executed by the processor 235, determines a navigating velocity and/or an intermediate destination for a mobile automated system. A navigating velocity is a velocity to navigate a mobile automated system from a start point to a navigating destination. In one embodiment, a navigating velocity includes an angular velocity and a linear velocity. An angular velocity indicates a navigating direction to navigate the mobile automated system (e.g., a straight ahead direction, a direction with 45° away from the straight-line path on the left, etc.). A linear velocity indicates a speed with which the mobile automated system moves along the navigating direction (e.g., 0.5 m/s). In the illustrated embodiment, the navigating module 213 is communicatively coupled to the bus 220 via signal line 242.

In one embodiment, the navigating module 213 receives a clear signal from the estimation module 207 indicating that a path from the start point to the navigating destination (e.g., the final destination) is free from obstacles. The navigating module 213 determines a navigating velocity for navigating the mobile automated system along the clear path to the navigating destination. For example, the navigating module 213 determines an angular velocity as a straight-line path direction pointing directly to the navigating destination since the straight-line path is free from obstacles. The navigating module 213 determines a linear velocity as an average velocity (e.g., 0.5 m/s) determined by a distance (e.g., 10 meters) from the start point to the navigating destination and the time duration (e.g., 20 seconds) for the navigation process.

In another embodiment, the navigating module 213 receives a navigating direction from the vector module 211 and determines an angular velocity as the received navigating direction. The navigating module 213 determines an intermediate destination as described below and updates the navigating destination using the intermediate destination. For example, the navigating module 213 instructs the configuration module 203 to set the navigating destination as the intermediate destination. The navigating module 213 updates a path from the start point to the updated navigating destination. For example, the navigating module 213 instructs the path module 205 to determine a new path from the start point to the updated navigating destination. The navigating module 213 determines a linear velocity as an average velocity (e.g., 0.5 m/s) determined by a distance (e.g., 10 meters) for the updated path and the time duration (e.g., 20 seconds) for the navigation process. The navigating module 213 updates the navigating velocity using the determined angular velocity and the determined linear velocity.

In one embodiment, the navigating module 213 determines a linear velocity based at least in part on the one or more obstacle parameters. For example, if an obstacle parameter indicates that a flow direction for a crowd of people is perpendicular to an angular velocity (or a navigating direction) of the mobile automated system, the navigating module 213 generates a minimum linear velocity for navigating the mobile automated system to cross the people flow. For example, as shown in FIGS. 7F, 7H, 7N and 7P the mobile automated system is navigated to cross the people flow, the navigating module 213 slows down the linear velocity and instructs the mobile automated system to cross the people flow cautiously.

In one embodiment, the navigating module 213 stores the navigating velocity in the storage 243. In another embodiment, the navigating module 213 sends the navigating velocity to the command module 215.

In one embodiment, the navigating module 213 determines an intermediate destination to avoid interference of the obstacles based at least in part on one or more of the navigating direction, one or more obstacle parameters in the navigating direction, the left obstacle image density and the right obstacle image density, etc. For example, the navigating module 213 determines an intermediate destination as a point in the navigating direction with least obstacles. In another example, the navigating module 213 determines an intermediate destination as a point in the navigating direction with a least obstacle image density. In yet another example, an administrator of the mobile automated system determines an intermediate destination and provides the intermediate destination to the navigating module 213.

In one embodiment, the navigating module 213 monitors the navigation process of the mobile automated system and determines whether the mobile automated system arrives at the navigating destination. For example, the navigating module 213 tracks a location of the mobile automated system using a GPS as the mobile automated system is navigated to the navigating destination. The navigating module 213 determines that the mobile automated system arrives at the navigating destination if a distance between the detected location and the navigating destination is less than a predetermined number (e.g., less than 1 meter or 0.3 meter, etc.).

If the mobile automated system arrives at the navigating destination, the navigating module 213 determines whether the arrived navigating destination is the final destination. If the arrived navigating destination is the final destination, the navigating module 213 instructs the command module 215 to generate a motion command to stop the motion of the mobile automated system. If the arrived navigating destination is not the final destination (e.g., the arrived navigating destination is an intermediate destination), the navigating module 213 instructs the configuration module 203 to set a new start point for a next navigation process as the arrived intermediate destination and a new navigating destination as the final destination. The navigation application 109 continues to start a new navigation process from the arrived intermediate destination to the final destination for the mobile automated system.

The command module 215 is code and routines that, when executed by the processor 235, generates one or more motion commands. In the illustrated embodiment, the command module 215 is communicatively coupled to the bus 220 via signal line 244. In one embodiment, the command module 215 receives a signal from the navigating module 213 indicating that the mobile automated system arrives at the final destination. The command module 215 generates a stop command and sends the stop command to the motor controller 115, causing the motor controller 115 to stop the motion of the mobile automated system.

In one embodiment, the command module 215 receives a navigating velocity from the navigating module 213 and generates one or more motion commands based at least in part on the navigating velocity. The one or more motion commands include instructions for navigating the mobile automated system using the navigating velocity. The command module 215 sends the one or more motion commands to the motor controller 115, causing the motor controller 115 to navigate the mobile automated system to the navigating destination using the navigating velocity. In one embodiment, the command module 215 receives an intermediate destination from the navigating module 213 and prioritizes the navigation to the intermediate destination over other navigations to other destinations.

The user interface module 217 is code and routines that, when executed by the processor 235, generates graphical data for providing user interfaces to a user. In the illustrated embodiment, the user interface module 217 is communicatively coupled to the bus 220 via signal line 246. In one embodiment, the user interface module 217 generates graphical data for providing a user interface to a user. The user interface allows the user to input one or more of a start point, an intermediate destination and a final destination for navigating a mobile automated system.

In one embodiment, the user interface module 217 receives a navigating velocity from the navigating module 213 and generates graphical data for providing a user interface that depicts the navigating velocity. The user interface module 217 sends the graphical data to the control unit 101, causing the control unit 101 to present the user interface in a display device connected to the control unit 101. The user interface module 217 may generate other graphical data for providing other user interfaces to users.

Methods

Figure 3:
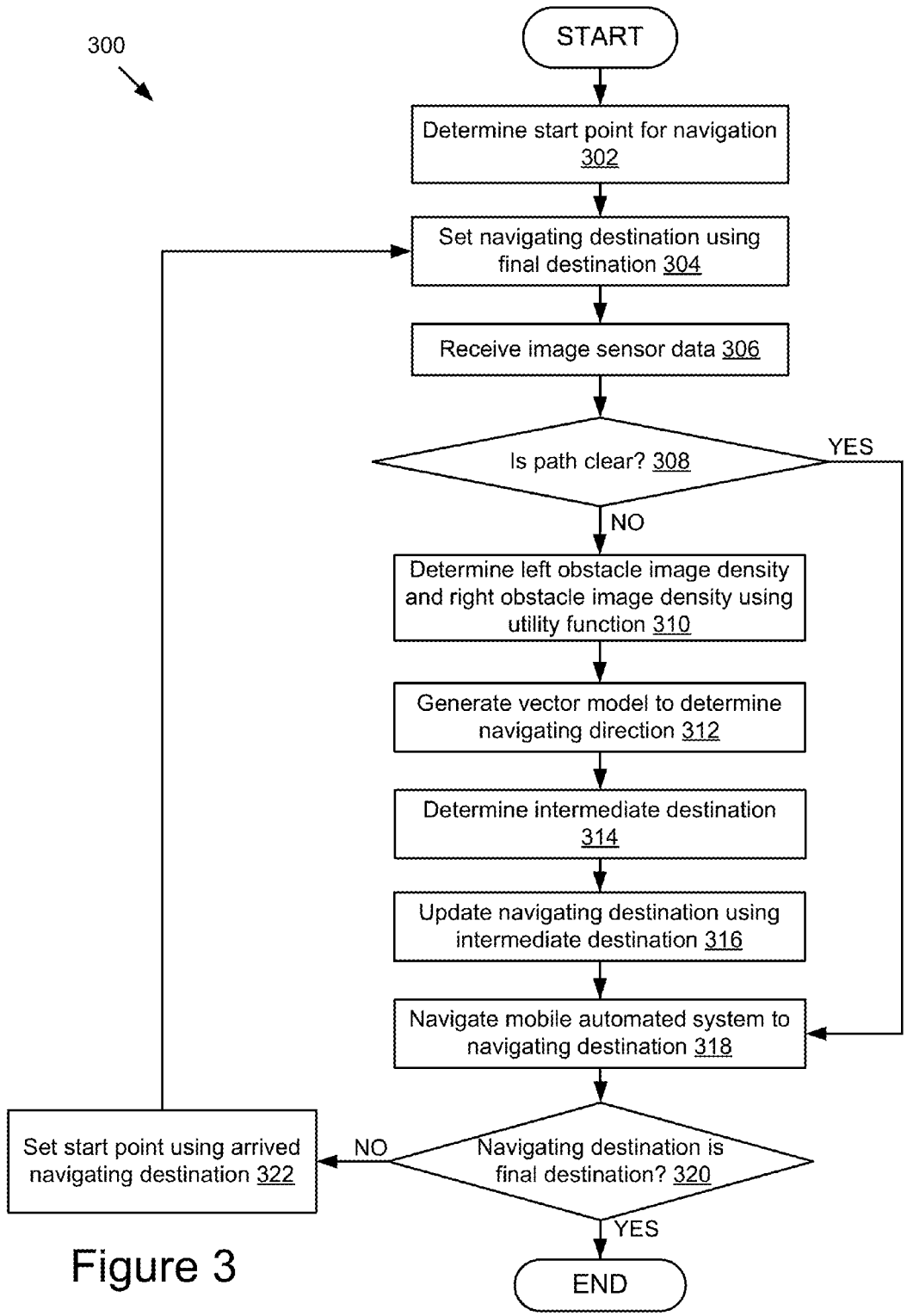
FIG. 3 is a flowchart illustrating a method for navigating a mobile automated system through obstacles according to one embodiment.
Figure 4A:
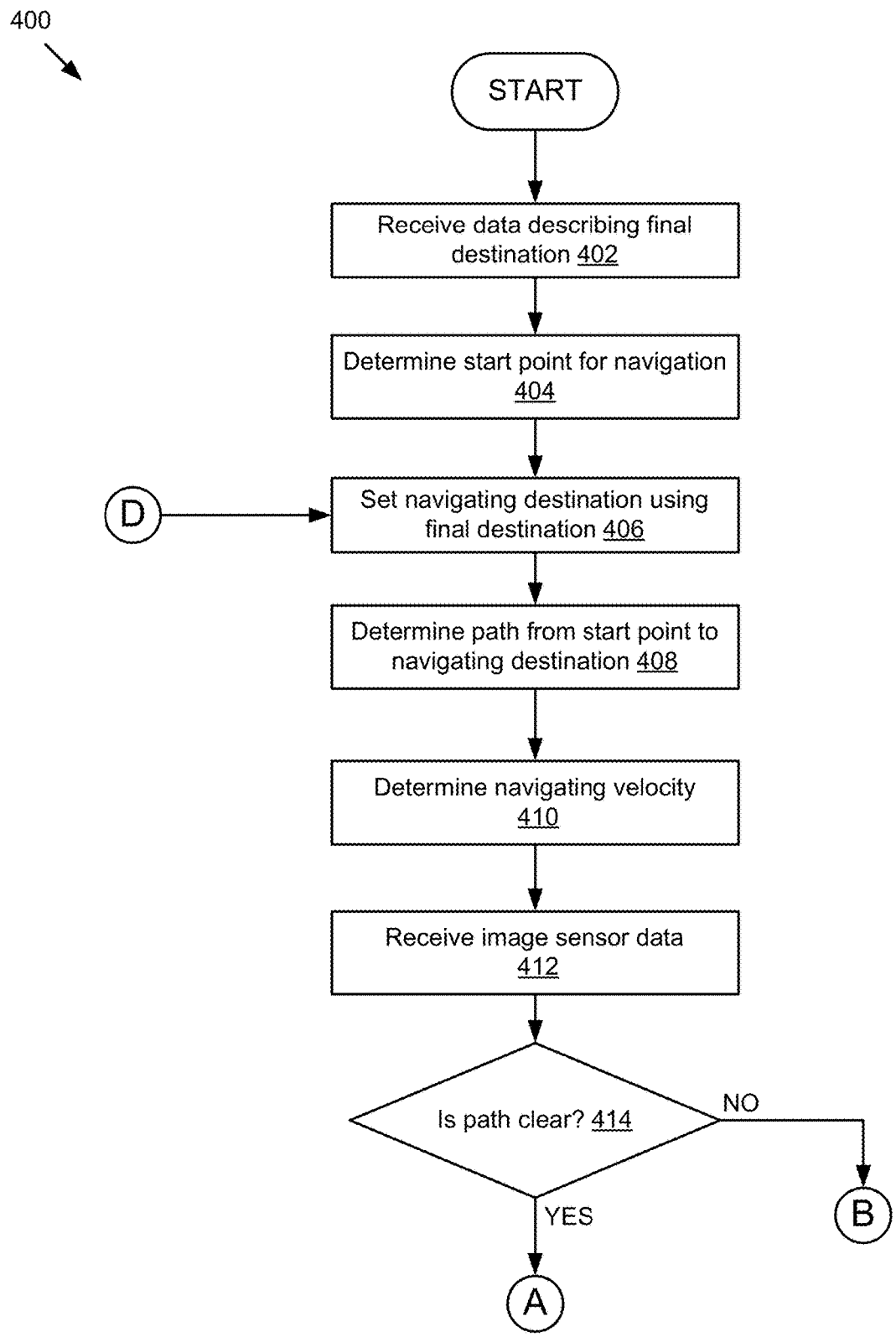
FIGS. 4A-4C are flowcharts illustrating a method for navigating a mobile automated system through obstacles according to another embodiment.
Figure 4B:
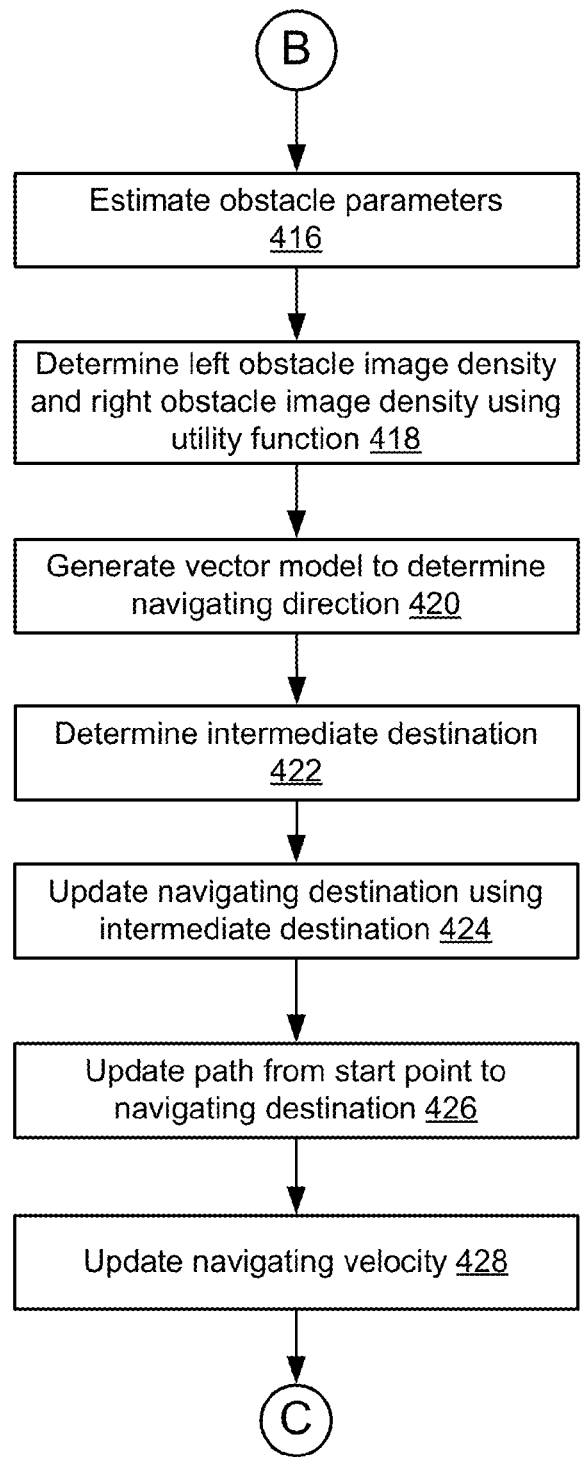
Figure 4C:
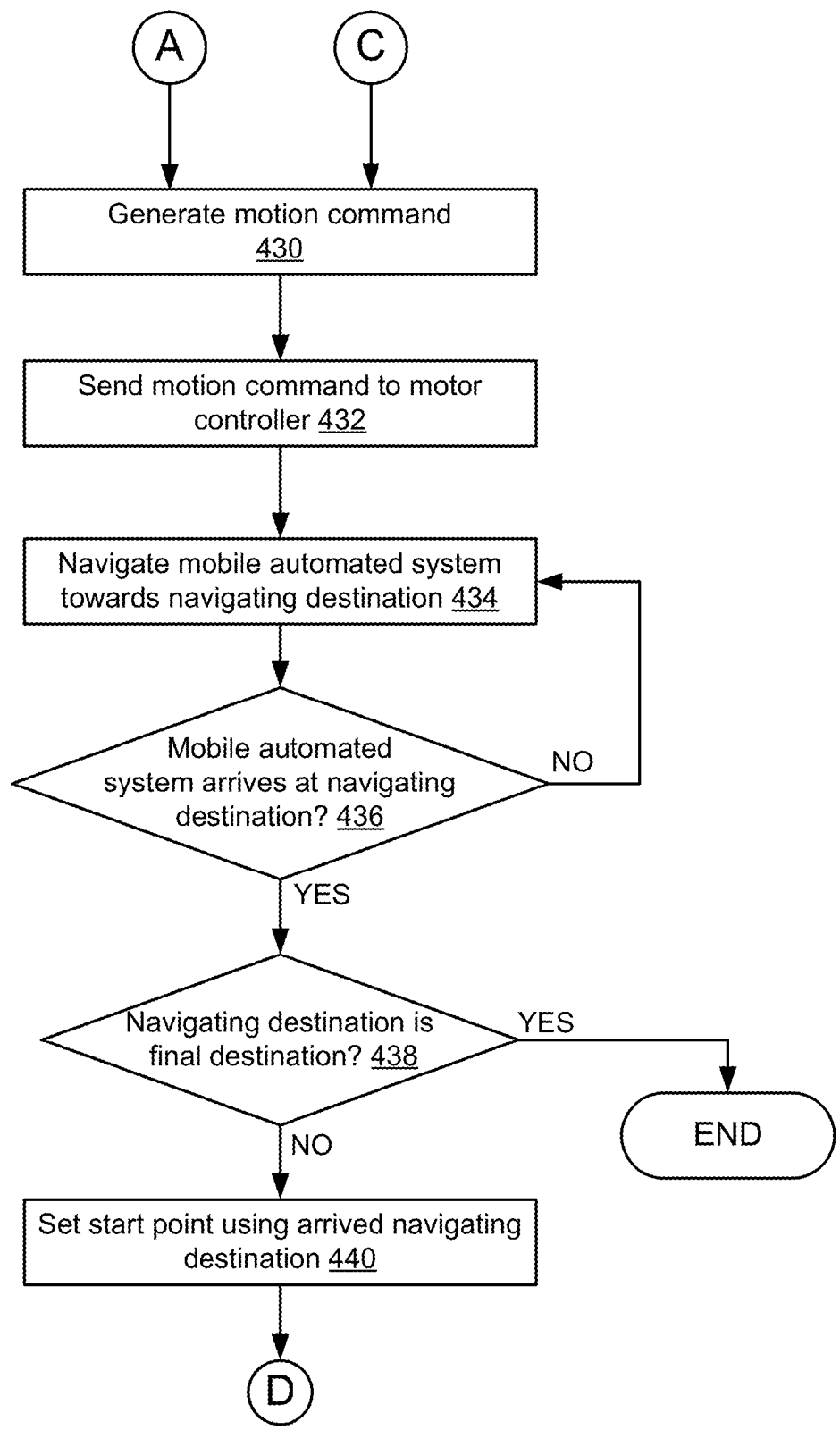

Referring now to FIGS. 3-4C, various embodiments of the method of the specification will be described. FIG. 3 is a flowchart illustrating a method 300 for navigating a mobile automated system through obstacles according to one embodiment. In one embodiment, the configuration module 203 determines 302 a start point for a navigation process. The configuration module 203 also determines a final destination for the navigation process. The configuration module 203 sets 304 a navigating destination for the navigation process as the final destination.

The communication module 201 receives 306 image sensor data from the sensor 113 and sends the image sensor data to the estimation module 207. The estimation module 207 determines 308 whether a path (e.g., a straight-line path) from the start point to the navigating destination is free from obstacles based at least in part on the image sensor data. If the path is free from obstacles, the method 300 moves to step 318. Otherwise, the estimation module 207 determines one or more obstacle parameters (e.g., left obstacle parameters and right obstacle parameters) based at least in part on the image sensor data and the method 300 moves to step 310. Turning to step 310, the density module 209 applies a utility function to determine a left obstacle image density and a right obstacle image density using the one or more obstacle parameters as inputs to the utility function.

The vector module 211 generates 312 a vector model to determine a navigating direction based at least in part on the left obstacle image density and the right obstacle image density. The navigating module 213 determines 314 an intermediate destination based at least in part on one or more of the obstacle parameters, the left obstacle image density, the right obstacle image density and the navigating direction. The navigating module 213 updates 316 the navigating destination using the intermediate destination. The navigating module 213 determines a navigating velocity and instructs the command module 215 to generate one or more motion commands based at least in part on the navigating velocity. The motor controller 115 navigates 318 the mobile automated system to the navigating destination according to the one or more motion commands.

The navigating module 213 determines 320 whether the arrived navigating destination is the final destination. If the arrived navigating destination is the final destination, the method 300 ends. Otherwise, the navigating module 213 instructs the configuration module 203 to set 322 a new start point as the arrived navigating destination and the method 300 moves to step 304.

FIGS. 4A-4C are flowcharts illustrating a method 400 for navigating a mobile automated system through obstacles according to another embodiment. Turning to FIG. 4A, the communication module 201 receives 402 data describing a final destination from a user. The configuration module 203 determines 404 a start point for a navigation process to the final destination. In one embodiment, the configuration module 203 receives data describing the start point from the user via the communication module 201. The configuration module 203 sets 406 a navigating destination as the final destination. The path module 205 determines 408 a path (e.g., a straight-line path) from the start point to the navigating destination such as the final destination. The navigating module 213 determines 410 a navigating velocity for navigating the mobile automated system along the path to the navigating destination.

In one embodiment, the communication module 201 receives 412 image sensor data from the sensor 113. The communication module 201 sends the image sensor data to the estimation module 207. The estimation module 207 determines 414 whether the path is free from obstacles. If the path is free from obstacles, the method 400 moves to step 430 depicted in FIG. 4C. Otherwise, the method 400 moves to step 416 depicted in FIG. 4B.

Referring to FIG. 4B, the estimation module 207 estimates 416 one or more obstacle parameters (e.g., left obstacle parameters, right obstacle parameters) based at least in part on the image sensor data. The density module 209 applies a utility function to determine 418 a left obstacle image density and a right obstacle image density using the one or more obstacle parameters (e.g., left obstacle parameters and right obstacle parameters respectively) as inputs to the utility function respectively. The vector module 211 generates 420 a vector model to determine a navigating direction for the mobile automated system based at least in part on the left obstacle image density and the right obstacle image density.

The navigating module 213 determines 422 an intermediate destination based at least in part on one or more of the left obstacle image density, the right obstacle image density, the one or more obstacle parameters and the navigating direction. The navigating module 213 updates 424 the navigating destination as the intermediate destination. The navigating module 213 updates 426 the path from the start point to the updated navigating destination. The navigating module 213 updates 428 the navigating velocity based at least in part on the navigating direction and the updated path.

Referring to FIG. 4C, the command module 215 generates 430 one or more motion commands based at least in part on the navigating velocity. The command module 215 sends 432 the one or more motion commands to the motor controller 115. The motor controller 115 navigates 434 the mobile automated system towards the navigating destination based at least in part on the one or more motion commands. The navigating module 213 monitors the navigation of the mobile automated system and determines 436 whether the mobile automated system arrives at the navigating destination. If the mobile automated system arrives at the navigating destination, the method 400 moves to step 438. Otherwise, the method 400 moves to step 434.

Turning to step 438, the navigating module 213 determines whether the navigating destination is the final destination. If the navigating destination is the final destination, the method 400 ends. Otherwise, the navigating module 213 instructs the configuration module 203 to set 440 a new start point as the arrived navigating destination and the method 400 moves to step 406 depicted in FIG. 4A.

Graphical Representations

FIG. 5A is a graphical representation 500 illustrating a field of view of a mobile automated system using a sensor 113 according to one embodiment. In this example, the graphical representation 500 depicts a start point 504, a destination 502 and a straight-line path 506 from the start point 504 to the destination 502 for a navigating process. The destination 502 is one of an intermediate destination and a final destination. The area between a first line 510 and a second line 512 including the straight-line path 506 illustrates the field of view of the sensor 113. FIG. 5A also depicts a plurality of obstacles in the field of view of the sensor 113. An object 508 is an example obstacle.

In the illustrated embodiment, a left area of the field of view (e.g., an area between the straight-line path 506 and the line 510) has an obstacle band with an inner radius $R_{i,L}$ and an outer radius $R_{o,L}$. A right area of the field of view (e.g., an area between the straight-line path 506 and the line 512) has an obstacle band with an inner radius $R_{i,R}$ and an outer radius $R_{o,R}$. The left area of the field of view has less obstacles than the right area of the field of view, and therefore an absolute value for a left obstacle image density is smaller than an absolute value for a right obstacle image density (e.g., $\|\vec{D}_L\| < \|\vec{D}_R\|$). The calculation for the left obstacle image density and the right obstacle image density is illustrated below. The symbol $\vec{u}_x$ represents a unit vector in the direction of the straight-line path. The symbol $\vec{u}_y$ represents a unit vector having a direction perpendicular to the direction of the straight-line path.

In the illustrated embodiment, the sensor 113 is a Kinect® camera sensor having a field of view of 60° (or π/3 radians). The density module 209 determines the left obstacle image density $\vec{D}_L$ using a utility function as following:

$$\vec{D}_L = \begin{cases} \dfrac{n_L}{(\theta_{sensor}/4\pi)(R_{o,L}^2 - R_{i,L}^2)} \times \dfrac{\|\vec{V}_{L,x}\|}{R_{i,L}} \vec{u}_y, & \text{if } \dfrac{\vec{V}_L \cdot \vec{u}_x}{\|\vec{u}_x\|} \geq 0; \\ \dfrac{\rho \times n_L}{(\theta_{sensor}/4\pi)(R_{o,L}^2 - R_{i,L}^2)} \times \dfrac{\|\vec{V}_{L,x}\|}{R_{i,L}} \vec{u}_y, & \text{if } \dfrac{\vec{V}_L \cdot \vec{u}_x}{\|\vec{u}_x\|} < 0. \end{cases}$$

In the above mathematical expression, the symbol $n_L$ represents the number of obstacles in the left area of the field of view. The symbol $\theta_{sensor}$ represents a field of view of the sensor 113 (e.g., π/3 radians for a Kinect® camera sensor). The symbols $R_{i,L}$ and $R_{o,L}$ represent an inner radius and an outer radius of an obstacle band for the left area of the field of view respectively. The symbol $\vec{V}_L$ represents an average relative velocity between the obstacles in the left area of the field of view and the mobile automated system. The symbol $\vec{V}_{L,x}$ represents an x-component of an average relative velocity between the obstacles in the left area of the field of view and the mobile automated system. The symbol $\rho$ represents a coefficient. For example, an experimental result for the coefficient is $\rho=1.5$.

The density module 209 determines the right obstacle image density $\vec{D}_R$ using a utility function as following:

$$\vec{D}_R = \begin{cases} \dfrac{n_R}{(\theta_{sensor}/4\pi)(R_{o,R}^2 - R_{i,R}^2)} \times \dfrac{\|\vec{V}_{R,x}\|}{R_{i,R}} \vec{u}_y, & \text{if } \dfrac{\vec{V}_R \cdot \vec{u}_x}{\|\vec{u}_x\|} \geq 0; \\ \dfrac{\rho \times n_R}{(\theta_{sensor}/4\pi)(R_{o,R}^2 - R_{i,R}^2)} \times \dfrac{\|\vec{V}_{R,x}\|}{R_{i,R}} \vec{u}_y, & \text{if } \dfrac{\vec{V}_R \cdot \vec{u}_x}{\|\vec{u}_x\|} < 0. \end{cases}$$

In the above mathematical expression, the symbol $n_R$ represents the number of obstacles in the right area of the field of view. The symbols $R_{i,R}$ and $R_{o,R}$ represent an inner radius and an outer radius of an obstacle band for the right area of the field of view respectively. The symbol $\vec{V}_R$ represents an average relative velocity between the obstacles in the right area of the field of view and the mobile automated system. The symbol $\vec{V}_{R,x}$ represents an x-component of an average relative velocity between the obstacles in the right area of the field of view and the mobile automated system.

Figure 5B:
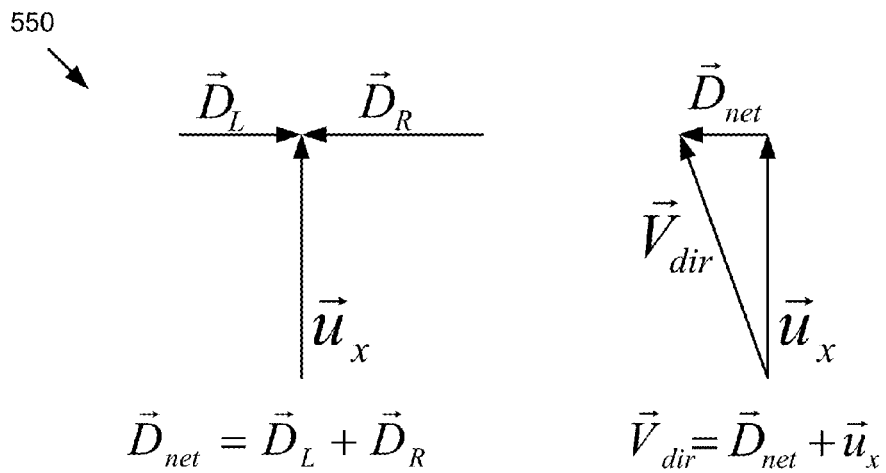
FIG. 5B is a graphical representation illustrating a vector model for determining a navigating direction according to one embodiment.

FIG. 5B is a graphical representation 550 illustrating a vector model for determining a navigating direction according to one embodiment. In the illustrated embodiment, the vector model corresponds to the left obstacle image density $\vec{D}_L$ and the right obstacle image density $\vec{D}_R$ obtained from FIG. 5A. The vector module 211 determines a net density as:

$$\vec{D}_{net} = \vec{D}_L + \vec{D}_R.$$

The vector module 211 determines a direction vector as:

$$\vec{V}_{dir} = \vec{D}_{net} + \vec{u}_x.$$

The vector module 211 determines a navigating direction as the same direction as the direction vector $\vec{V}_{dir}$.

Figure 6A:
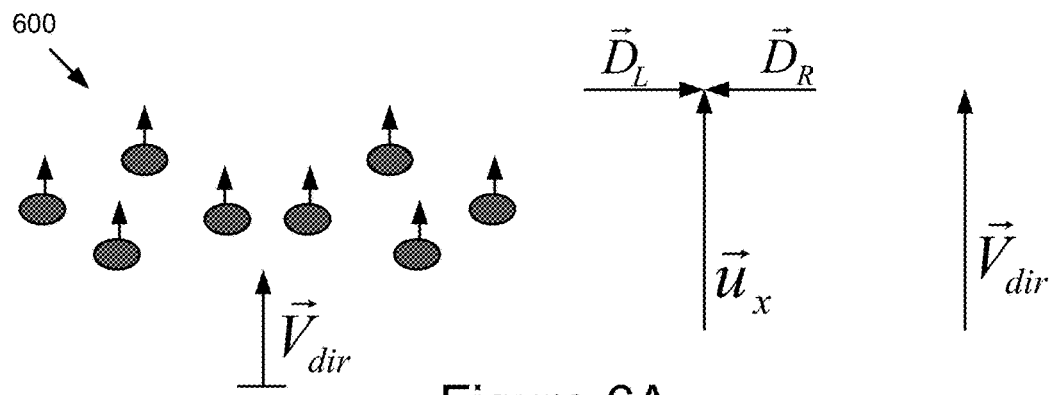
FIGS. 6A-6F are graphical representations illustrating various navigation scenarios with different obstacle distributions according to various embodiments.

FIGS. 6A-6F are graphical representations illustrating various navigation scenarios with different obstacle distributions according to various embodiments. FIG. 6A is a graphical representation 600 illustrating a navigation scenario with equal obstacle distributions on a left hand side and a right hand side of a path (e.g., a straight-line path) according to one embodiment. The obstacles move in the same direction as the path direction (e.g., the direction of $\vec{u}_x$). A vector model depicted in FIG. 6A indicates that a left obstacle image density is equal to a right obstacle image density (e.g., $\|\vec{D}_L\|=\|\vec{D}_R\|$). The direction vector $\vec{V}_{dir}$ has the same direction as the path direction $\vec{u}_x$. In this example, the mobile automated system is navigated according to the path direction.

Figure 6B:
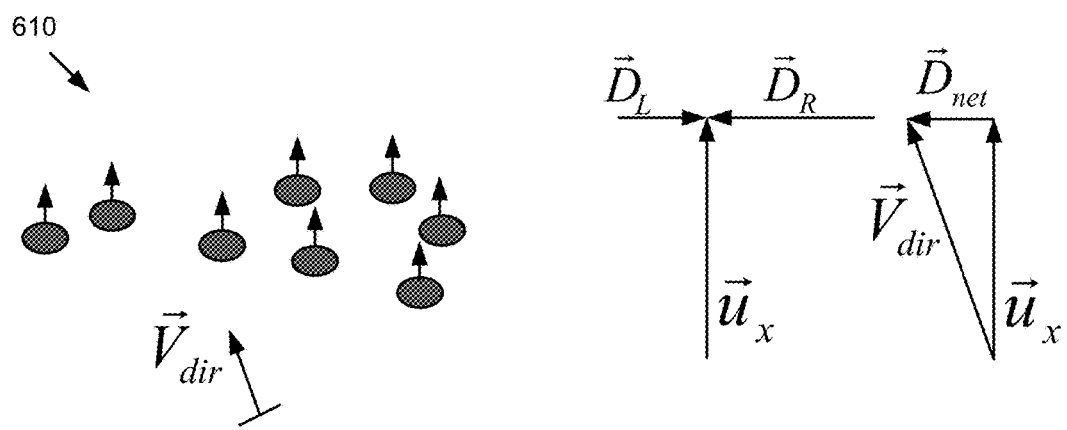

FIG. 6B is a graphical representation 610 illustrating a navigation scenario with more obstacles on a right hand side of a path than a left hand side of the path according to one embodiment. The obstacles move in the same direction as the path direction (e.g., the direction of $\vec{u}_x$). A vector model depicted in FIG. 6B indicates that a left obstacle image density is less than a right obstacle image density (e.g., $\|\vec{D}_L\|<\|\vec{D}_R\|$). The direction vector $\vec{V}_{dir}$ is determined according to the vector model. Accordingly, the mobile automated system is navigated in a direction with least obstacles according to the navigating direction determined by the direction vector $\vec{V}_{dir}$.

Figure 6C:
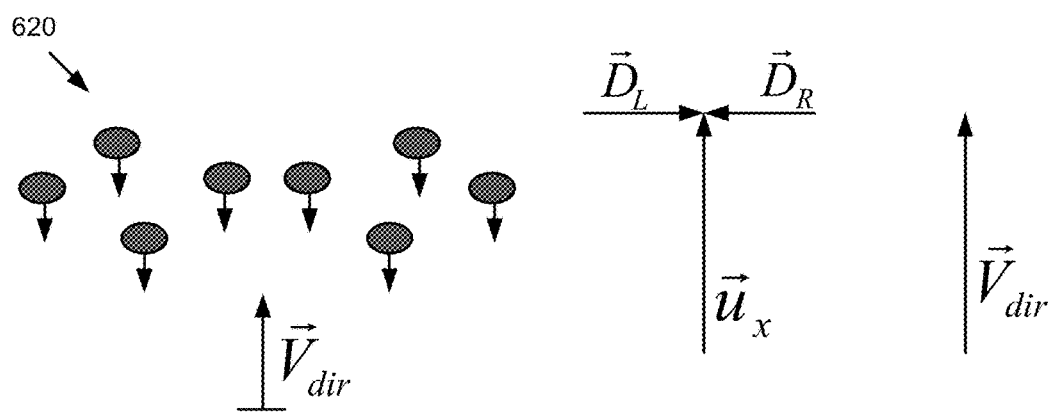

FIG. 6C is a graphical representation 620 illustrating a navigation scenario with equal obstacle distributions on a left hand side and a right hand side of a path according to one embodiment. The obstacles move in the opposite direction of the path direction. A vector model depicted in FIG. 6C indicates that a left obstacle image density is equal to the right obstacle image density (e.g., $\|\vec{D}_L\|=\|\vec{D}_R\|$). The direction vector $\vec{V}_{dir}$ has the same direction as the path direction $\vec{u}_x$. In this example, the mobile automated system is navigated according to the path direction.

Figure 6D:
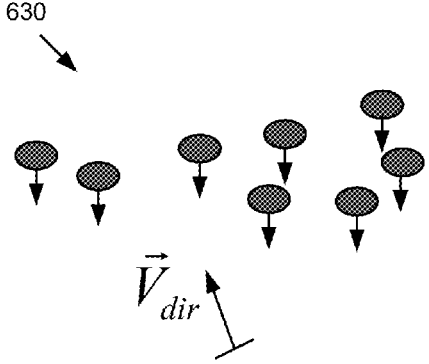
Figure 6D:
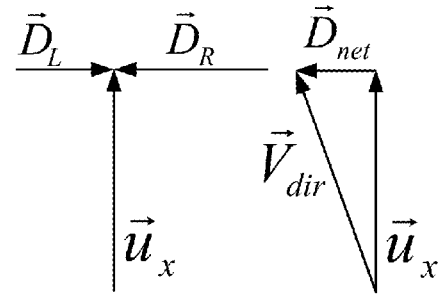

FIG. 6D is a graphical representation 630 illustrating a navigation scenario with more obstacles on a right hand side of a path than a left hand side of the path according to one embodiment. The obstacles move in the opposite direction of the path direction. A vector model depicted in FIG. 6D indicates that a left obstacle image density is less than a right obstacle image density (e.g., $\|\vec{D}_L\|<\|\vec{D}_R\|$). Accordingly, the mobile automated system is navigated in a direction with least obstacles according to the navigating direction determined by the direction vector $\vec{V}_{dir}$.

Figure 6E:
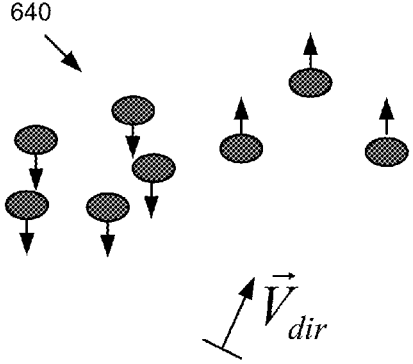
Figure 6E:
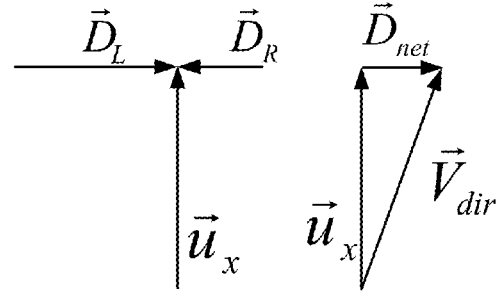

FIG. 6E is a graphical representation 640 illustrating a navigation scenario with more obstacles on a left hand side of a path than a right hand side of the path according to one embodiment. The graphical representation 640 also applies to a navigation scenario with equal obstacles on both sides of the path. The obstacles on the left hand side of the path move in the opposite direction of the path direction. The obstacles on the right hand side of the path move in the same direction as the path direction. A vector model depicted in FIG. 6E indicates that a left obstacle image density is greater than a right obstacle image density (e.g., $\|\vec{D}_L\|>\|\vec{D}_R\|$). Accordingly, the mobile automated system is merged to the flow of obstacles on the right hand side of the path and navigated in a direction with least obstacles according to the navigating direction determined by the direction vector $\vec{V}_{dir}$.

Figure 6F:
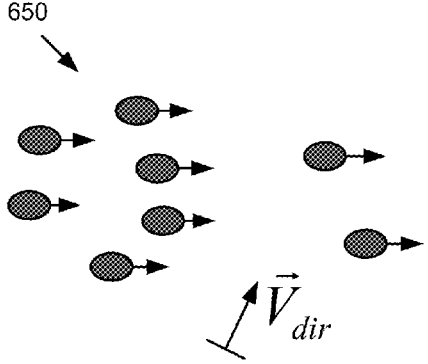
Figure 6F:
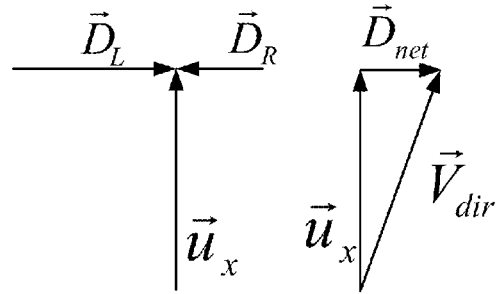

FIG. 6F is a graphical representation 650 illustrating a navigation scenario with more obstacles on a left hand side of a path than a right hand side of the path according to one embodiment. The obstacles move in a direction perpendicular to the path direction. A vector model depicted in FIG. 6E indicates that a left obstacle image density is greater than a right obstacle image density (e.g., $\|\vec{D}_L\| > \|\vec{D}_R\|$). Accordingly, the mobile automated system is merged to the flow of obstacles on the right hand side of the path and navigated in a direction with least obstacles according to the navigating direction determined by the direction vector $\vec{V}_{dir}$.

Figure 7A:
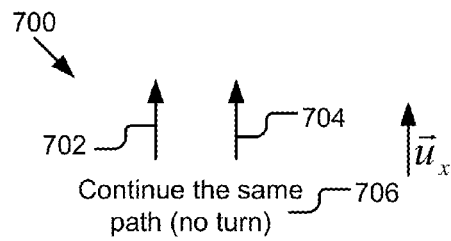
FIGS. 7A-7P are graphical representations illustrating various navigation actions for various navigation scenarios with different obstacle distributions according to various embodiments.
Figure 7B:
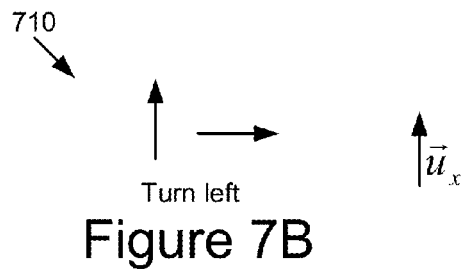
Figure 7C:
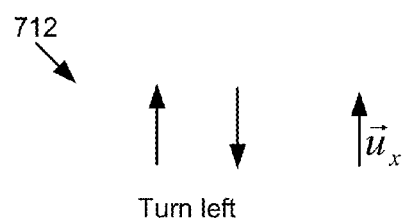
Figure 7D:
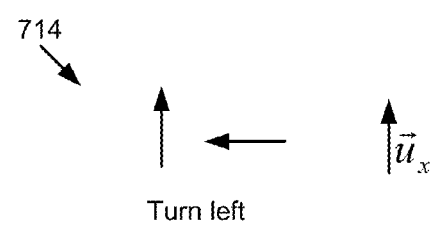
Figure 7E:
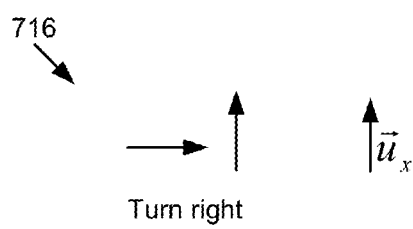
Figure 7F:
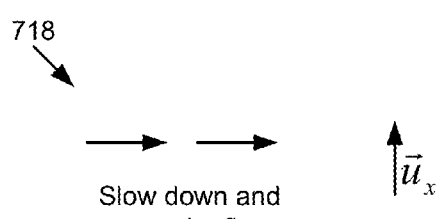
Figure 7G:
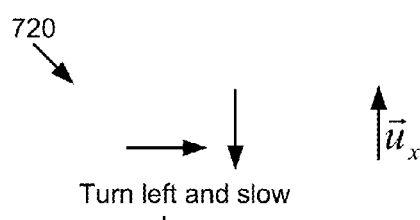
Figure 7H:
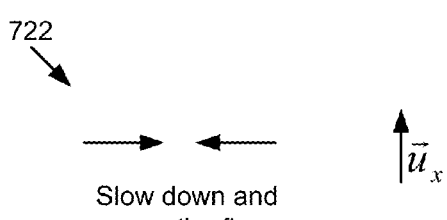
Figure 7I:
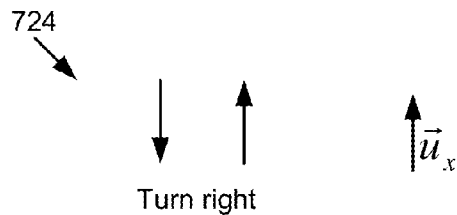
Figure 7J:
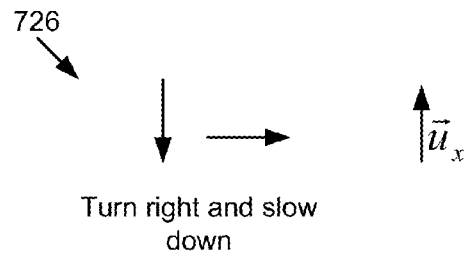
Figure 7K:
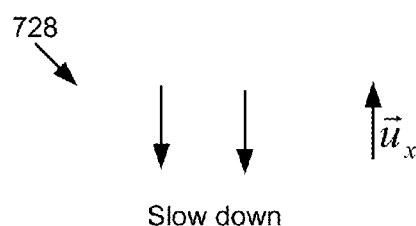
Figure 7L:
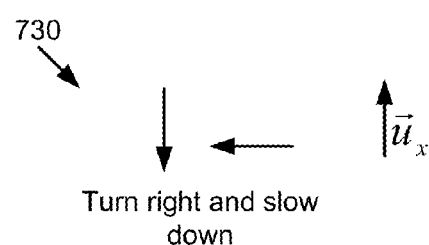
Figure 7M:
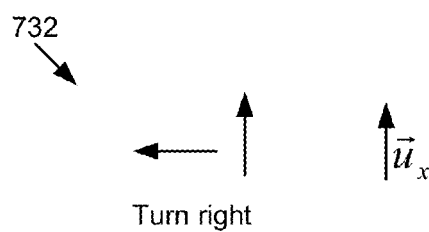
Figure 7N:
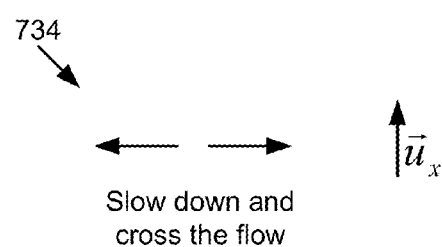
Figure 7O:
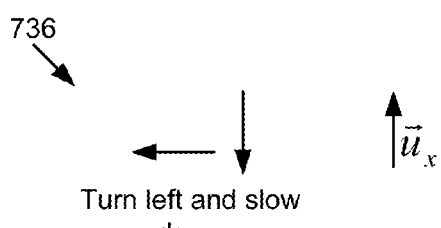
Figure 7P:
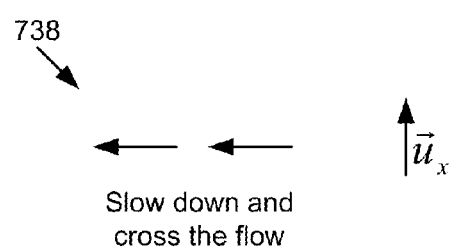

FIGS. 7A-7P are graphical representations illustrating various navigation actions for various navigation scenarios with different obstacle moving directions according to various embodiments. FIG. 7A is a graphical representation 700 illustrating a navigation scenario with obstacles moving in the same direction as the path direction according to one embodiment. For example, line 702 indicates that the obstacles on a left hand side of the path move in the same direction as the path direction. Line 704 indicates that the obstacles on a right hand side of the path also move in the same direction as the path direction. A mobile automated system is navigated according to a navigation action 706 of "Continue the same path (no turn)."

FIG. 7B is a graphical representation 710 illustrating a navigation scenario with obstacles on a left hand side of a path moving in the same direction as the path direction and obstacles on a right hand side of the path moving in a direction perpendicular to the path direction according to one embodiment. A mobile automated system is navigated according to a navigation action "Turn left."

FIG. 7C is a graphical representation 712 illustrating a navigation scenario with obstacles on a left hand side of a path moving in the same direction as the path direction and obstacles on a right hand side of the path moving in the opposite direction of the path direction according to one embodiment. A mobile automated system is navigated according to a navigation action "Turn left."

FIG. 7D is a graphical representation 714 illustrating a navigation scenario with obstacles on a left hand side of a path moving in the same direction as the path direction and obstacles on a right hand side of the path moving in a direction perpendicular to the path direction according to one embodiment. A mobile automated system is navigated according to a navigation action "Turn left."

FIG. 7E is a graphical representation 716 illustrating a navigation scenario with obstacles on a left hand side of a path moving in a direction perpendicular to a path direction and obstacles on a right hand side of the path moving in the same direction as the path direction according to one embodiment. A mobile automated system is navigated according to a navigation action "Turn right."

FIG. 7F is a graphical representation 718 illustrating a navigation scenario with obstacles moving in a direction perpendicular to a path direction according to one embodiment. A mobile automated system is navigated according to a navigation action "Slow down and cross the flow."

FIG. 7G is a graphical representation 720 illustrating a navigation scenario with obstacles on a left hand side of a path moving in a direction perpendicular to a path direction and obstacles on a right hand side of the path moving in the opposite direction of the path direction according to one embodiment. A mobile automated system is navigated according to a navigation action "Turn left and slow down."

FIG. 7H is a graphical representation 722 illustrating a navigation scenario with obstacles moving in directions perpendicular to a path direction according to one embodiment. A mobile automated system is navigated according to a navigation action "Slow down and cross the flow."

FIG. 7I is a graphical representation 724 illustrating a navigation scenario with obstacles on a left hand side of a path moving in an opposite direction of a path direction and obstacles on a right hand side of the path moving in the same direction as the path direction according to one embodiment. A mobile automated system is navigated according to a navigation action "Turn right."

FIG. 7J is a graphical representation 726 illustrating a navigation scenario with obstacles on a left hand side of a path moving in an opposite direction of a path direction and obstacles on a right hand side of the path moving in a direction perpendicular to the path direction according to one embodiment. A mobile automated system is navigated according to a navigation action "Turn right and slow down."

FIG. 7K is a graphical representation 728 illustrating a navigation scenario with obstacles moving in a direction opposite to a path direction according to one embodiment. A mobile automated system is navigated according to a navigation action "Slow down."

FIG. 7L is a graphical representation 730 illustrating a navigation scenario with obstacles on a left hand side of a path moving in an opposite direction of a path direction and obstacles on a right hand side of the path moving in a direction perpendicular to the path direction according to one embodiment. A mobile automated system is navigated according to a navigation action "Turn right and slow down."

FIG. 7M is a graphical representation 732 illustrating a navigation scenario with obstacles on a left hand side of a path moving in a direction perpendicular to a path direction and obstacles on a right hand side of the path moving in the same direction as the path direction according to one embodiment. A mobile automated system is navigated according to a navigation action "Turn right."

FIG. 7N is a graphical representation 734 illustrating a navigation scenario with obstacles moving in directions perpendicular to a path direction according to one embodiment. A mobile automated system is navigated according to a navigation action "Slow down and cross the flow."

FIG. 7O is a graphical representation 736 illustrating a navigation scenario with obstacles on a left hand side of a path moving in a direction perpendicular to a path direction and obstacles on a right hand side of the path moving in an opposite direction of the path direction according to one embodiment. A mobile automated system is navigated according to a navigation action "Turn left and slow down."

FIG. 7P is a graphical representation 738 illustrating a navigation scenario with obstacles moving in a direction perpendicular to a path direction according to one embodiment. A mobile automated system is navigated according to a navigation action "Slow down and cross the flow."

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for navigating a mobile automated system through obstacles, the method comprising:
    receiving image sensor data from one or more sensors, the image sensor data including left image sensor data related to a left portion of a field of view of the one or more sensors and right image sensor data related to a right portion of the field of view of the one or more sensors;
    prior to determining a left obstacle image density, estimating one or more left obstacle parameters describing obstacles on the left portion of the field of view based at least in part on the left image sensor data, the one or more left obstacle parameters including a first number of obstacles on the left portion of the field of view;
    prior to determining a right obstacle image density, estimating one or more right obstacle parameters describing obstacles on the right portion of the field of view based at least in part on the right image sensor data, the one or more right obstacle parameters including a second number of obstacles on the right portion of the field of view;
    determining the left obstacle image density describing a density of the obstacles on the left portion of the field of view for a path from a start point to a navigating destination based at least in part on one or more values associated with the one or more left obstacle parameters, the left obstacle image density being a first vector having a vector length proportional to the first number of obstacles on the left portion of the field of view;
    determining the right obstacle image density describing a density of the obstacles on the right portion of the field of view for the path from the start point to the navigating destination based at least in part on one or more values associated with the one or more right obstacle parameters, the right obstacle image density being a second vector having a vector length proportional to the second number of obstacles on the right portion of the field of view;
    generating a net density based on the left obstacle image density and the right obstacle image density, the net density being a vector sum of the first vector having the vector length proportional to the first number of obstacles on the left portion of the field of view and the second vector having the vector length proportional to the second number of obstacles on the right portion of the field of view;
    generating a direction vector based on the net density, the direction vector indicating a navigating direction for navigating the mobile automated system to the navigating destination;
    determining a first navigating velocity for navigating the mobile automated system to the navigating destination based at least in part on the navigating direction; and
    generating one or more first navigating commands to navigate the mobile automated system to the navigating destination based at least in part on the first navigating velocity.

2. The method of claim 1, wherein the one or more left obstacle parameters and the one or more right obstacle parameters describe one or more moving objects and the one or more right obstacle parameters describe one or more moving objects.

3. The method of claim 1, wherein the mobile automated system is a robot.

4. The method of claim 1, further comprising:
    determining an intermediate destination based at least in part on the left obstacle image density and the right obstacle image density; and
    updating the navigating destination as the intermediate destination.

5. The method of claim 1, wherein determining the left obstacle image density and the right obstacle image density comprises:
    using one or more of the one or more left obstacle parameters and the one or more right obstacle parameters as one or more inputs to a utility function; and
    applying the utility function to determine the left obstacle image density and the right obstacle image density.

6. The method of claim 1, wherein the first navigating velocity includes an angular velocity and a linear velocity, and determining the first navigating velocity comprises:
    determining the path from the start point to the navigating destination;
    determining the linear velocity from the start point to the navigating destination based at least in part on the path; and
    determining the angular velocity from the start point to the navigating destination based at least in part on the navigating direction.

7. The method of claim 1, further comprising:
    determining whether the mobile automated system arrives at the navigating destination;
    responsive to determining that the mobile automated system arrives at the navigating destination, determining whether the navigating destination is an intermediate destination; and
    responsive to determining that the navigating destination is the intermediate destination, updating the start point using the intermediate destination and updating the navigating destination using a final destination of the navigation.

8. The method of claim 1, further comprising:
    determining whether the path is clear of obstacles;
    responsive to determining that the path is clear, determining a second navigating velocity for navigating the mobile automated system along the path; and
    generating one or more second navigating commands to navigate the mobile automated system along the path based at least in part on the second navigating velocity.

9. The method of claim 1, wherein the navigating destination is one of a final destination and an intermediate destination.

10. A computer program product comprising a non-transitory computer readable medium encoding instructions that, in response to execution by a computing device, cause the computing device to perform operations comprising:
  receiving image sensor data from one or more sensors, the image sensor data including left image sensor data related to a left portion of a field of view of the one or more sensors and right image sensor data related to a right portion of the field of view of the one or more sensors;
  prior to determining a left obstacle image density, estimating one or more left obstacle parameters describing obstacles on the left portion of the field of view based at least in part on the left image sensor data, the one or more left obstacle parameters including a first number of obstacles on the left portion of the field of view;
  prior to determining a right obstacle image density, estimating one or more right obstacle parameters describing obstacles on the right portion of the field of view based at least in part on the right image sensor data, the one or more right obstacle parameters including a second number of obstacles on the right portion of the field of view;
  determining the left obstacle image density describing a density of the obstacles on the left portion of the field of view for a path from a start point to a navigating destination based at least in part on one or more values associated with the one or more left obstacle parameters, the left obstacle image density being a first vector having a vector length proportional to the first number of obstacles on the left portion of the field of view;
  determining the right obstacle image density describing a density of the obstacles on the right portion of the field of view for the path from the start point to the navigating destination based at least in part on one or more values associated with the one or more right obstacle parameters, the right obstacle image density being a second vector having a vector length proportional to the second number of obstacles on the right portion of the field of view;
  generating a net density based on the left obstacle image density and the right obstacle image density, the net density being a vector sum of the first vector having the vector length proportional to the first number of obstacles on the left portion of the field of view and the second vector having the vector length proportional to the second number of obstacles on the right portion of the field of view;
  generating a direction vector based on the net density, the direction vector indicating a navigation direction for navigating a mobile automated system to the navigating destination;
  determining a first navigating velocity for navigating the mobile automated system to the navigating destination based at least in part on the navigating direction; and
  generating one or more first navigating commands to navigate the mobile automated system to the navigating destination based at least in part on the first navigating velocity.

11. The computer program product of claim 10, wherein the one or more left obstacle parameters describe one or more left moving objects and the one or more right obstacle parameters describe one or more moving objects.

12. The computer program product of claim 10, wherein the mobile automated system is a robot.

13. The computer program product of claim 10, wherein the instructions cause the computing device to perform operations further comprising:
  determining an intermediate destination based at least in part on the left obstacle image density and the right obstacle image density; and
  updating the navigating destination as the intermediate destination.

14. The computer program product of claim 10, wherein determining the left obstacle image density and the right obstacle image density comprises:
  using one or more of the one or more left obstacle parameters and the one or more right obstacle parameters as one or more inputs to a utility function; and
  applying the utility function to determine the left obstacle image density and the right obstacle image density.

15. The computer program product of claim 10, wherein the first navigating velocity includes an angular velocity and a linear velocity, and determining the first navigating velocity comprises:
  determining the path from the start point to the navigating destination;
  determining the linear velocity from the start point to the navigating destination based at least in part on the path; and
  determining the angular velocity from the start point to the navigating destination based at least in part on the navigating direction.

16. The computer program product of claim 10, wherein the instructions cause the computing device to perform operations further comprising:
  determining whether the mobile automated system arrives at the navigating destination;
  responsive to determining that the mobile automated system arrives at the navigating destination, determining whether the navigating destination is an intermediate destination; and
  responsive to determining that the navigating destination is the intermediate destination, updating the start point using the intermediate destination and updating the navigating destination using a final destination of the navigation.

17. The computer program product of claim 10, wherein the instructions cause the computing device to perform operations further comprising:
  determining whether the path is clear of obstacles;
  responsive to determining that the path is clear, determining a second navigating velocity for navigating the mobile automated system along the path; and
  generating one or more second navigating commands to navigate the mobile automated system along the path based at least in part on the second navigating velocity.

18. The computer program product of claim 10, wherein the navigating destination is one of a final destination and an intermediate destination.

19. A system for navigating a mobile automated system through obstacles, the system comprising:
  a communication module for receiving image sensor data from one or more sensors, the image sensor data including left image sensor data related to a left portion of a field of view of the one or more sensors and right image sensor data related to a right portion of the field of view of the one or more sensors;
  an estimation module communicatively coupled to the communication module, the estimation module estimating, prior to determining a left obstacle image density, one or more left obstacle parameters describing obstacles on the left portion of the field of view based at least in part on the left image sensor data, the one or more left obstacle parameters including a first number of obstacles on the left portion of the field of view, the estimation module further estimating, prior to determining a right obstacle image density, one or more right obstacle parameters describing obstacles on the right portion of the field of view based at least in part on the right image sensor data, the one or more right obstacle parameters including a second number of obstacles on the right portion of the field of view;

a density module communicatively coupled to the estimation module, the density module determining the left obstacle image density describing a density of the obstacles on the left portion of the field of view for a path from a start point to a navigating destination based at least in part on one or more values associated with the one or more left obstacle parameters, the left obstacle image density being a first vector having a vector length proportional to the first number of obstacles on the left portion of the field of view, the density module further determining a right obstacle image density describing a density of the obstacles on the right portion of the field of view for the path from the start point to the navigating destination based at least in part on one or more values associated with the one or more right obstacle parameters, the right obstacle image density being a second vector having a vector length proportional to the second number of obstacles on the right portion of the field of view;

a vector module communicatively coupled to the density module, the vector module generating a net density based on the left obstacle image density and the right obstacle image density, the net density being a vector sum of the first vector having the vector length proportional to the first number of obstacles on the left portion of the field of view and the second vector having the vector length proportional to the second number of obstacles on the right portion of the field of view, the vector module further generating a direction vector based on the net density, the direction vector indicating a navigating direction for navigating a mobile automated system to the navigating destination;

a navigating module communicatively coupled to the vector module, the navigating module determining a first navigating velocity for navigating the mobile automated system to the navigating destination based at least in part on the navigating direction; and a command module communicatively coupled to the navigating module, the command module generating one or more first navigating commands to navigate the mobile automated system to the navigating destination based at least in part on the first navigating velocity.

20. The system of claim 19, wherein the one or more left obstacle parameters describe one or more moving objects and the one or more right obstacle parameters describe one or more moving objects.

21. The system of claim 19, wherein the mobile automated system is a robot.

22. The system of claim 19, wherein the navigating module is further configured to:
determine an intermediate destination based at least in part on the left obstacle image density and the right obstacle image density; and
update the navigating destination as the intermediate destination.

23. The system of claim 19, wherein the density module is configured to:
use one or more of the one or more left obstacle parameters and the one or more right obstacle parameters as one or more inputs to a utility function; and
apply the utility function to determine the left obstacle image density and the right obstacle image density.

24. The system of claim 19, wherein the first navigating velocity includes an angular velocity and a linear velocity, and the navigating module is configured to:
determine the linear velocity from the start point to the navigating destination based at least in part on the path; and
determine the angular velocity from the start point to the navigating destination based at least in part on the navigating direction.

25. The system of claim 19, wherein the navigating module is further configured to:
determine whether the mobile automated system arrives at the navigating destination;
responsive to determining that the mobile automated system arrives at the navigating destination, determine whether the navigating destination is an intermediate destination; and
responsive to determining that the navigating destination is the intermediate destination, update the start point using the intermediate destination and update the navigating destination using a final destination of the navigation.

26. The system of claim 19, wherein:
the estimation module is further configured to determine whether the path is clear of obstacles;
the navigating module is further configured to determine a second navigating velocity for navigating the mobile automated system along the path responsive to determining that the path is clear; and
the command module is further configured to generate one or more second navigating commands to navigate the mobile automated system along the path based at least in part on the second navigating velocity.

27. The system of claim 19, wherein the navigating destination is one of a final destination and an intermediate destination.

28. The method of claim 1, wherein
computing the direction vector is further based on a unit vector in a direction of a straight-line path from the start point to the navigation destination, wherein the navigating direction is the same direction as the direction vector.

29. The computer program product of claim 10, wherein computing the direction vector is further based on a unit vector in a direction of a straight-line path from the start point to the navigation destination, wherein the navigating direction is the same direction as the direction vector.

30. The system of claim 19, wherein
to compute the direction vector includes computing the direction vector further based on a unit vector in a direction of a straight-line path from the start point to the navigation destination, wherein the navigating direction is the same direction as the direction vector.

* * * * *